(12) United States Patent
Shibata et al.

(10) Patent No.: US 9,679,370 B2
(45) Date of Patent: Jun. 13, 2017

(54) IMAGE PROCESSING DEVICE AND IMAGE PROCESSING METHOD

(71) Applicant: NEC Corporation, Minato-ku, Tokyo (JP)

(72) Inventors: Takashi Shibata, Tokyo (JP); Akihiko Iketani, Tokyo (JP); Shuji Senda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 45 days.

(21) Appl. No.: 14/648,830

(22) PCT Filed: Dec. 5, 2013

(86) PCT No.: PCT/JP2013/007144
§ 371 (c)(1),
(2) Date: Jun. 1, 2015

(87) PCT Pub. No.: WO2014/087652
PCT Pub. Date: Jun. 12, 2014

(65) Prior Publication Data
US 2015/0302566 A1    Oct. 22, 2015

(30) Foreign Application Priority Data
Dec. 6, 2012   (JP) .................................. 2012-267402

(51) Int. Cl.
*G06K 9/00* (2006.01)
*G06T 5/50* (2006.01)
(Continued)

(52) U.S. Cl.
CPC .................. *G06T 5/50* (2013.01); *G06K 9/40* (2013.01); *G06K 9/6226* (2013.01);
(Continued)

(58) Field of Classification Search
CPC ................ G06K 9/00; G06T 3/00; G06T 5/00
(Continued)

(56) References Cited

U.S. PATENT DOCUMENTS 8,064,633 B2 * 11/2011 Noda ................ G06F 17/30265
                                                          348/383
8,363,953 B2 *  1/2013 Kameyama .......... H04N 19/115
                                                          382/195

FOREIGN PATENT DOCUMENTS

EP         2424220 A1    2/2012
JP      2010273328 A    12/2010
(Continued)

OTHER PUBLICATIONS

International Search Report for PCT Application No. PCT/JP2013/007144, mailed on Jan. 21, 2014.
(Continued)

*Primary Examiner* — Abolfazl Tabatabai

(57) ABSTRACT

The present invention provides an image processing device whereby the probability of outputting a restored image which accurately corresponds to an original image which is included in a low-quality input image is improved. This image processing device comprises: an image group generating means for generating, from the input image, using a dictionary which stores a plurality of patch pairs wherein a degradation patch which is a patch of a degraded image wherein a prescribed image is degraded is associated with a restoration patch which is a patch of this prescribed image, a plurality of restored image candidates including a plurality of different instances of content which have a possibility of being the original content of the input image; and an image selection presentation means for clustering the generated plurality of restored image candidates, and selecting and outputting an image candidate on the basis of the result of this clustering.

17 Claims, 25 Drawing Sheets

(51) Int. Cl.

| | |
|---|---|
| *G06K 9/62* | (2006.01) |
| *G06K 9/66* | (2006.01) |
| *G06T 11/60* | (2006.01) |
| *G06K 9/40* | (2006.01) |
| *G06T 5/00* | (2006.01) |
| *H04N 5/228* | (2006.01) |
| *G06T 3/40* | (2006.01) |

(52) U.S. Cl.
CPC ......... *G06K 9/6255* (2013.01); *G06K 9/6272* (2013.01); *G06K 9/66* (2013.01); *G06T 5/001* (2013.01); *G06T 11/60* (2013.01); *G06K 2209/01* (2013.01); *G06T 3/4053* (2013.01); *G06T 2207/20021* (2013.01); *G06T 2207/20081* (2013.01); *G06T 2207/20221* (2013.01)

(58) Field of Classification Search
USPC .................. 382/159, 225, 275; 348/222.1
See application file for complete search history.

(56) References Cited

FOREIGN PATENT DOCUMENTS

| | | |
|---|---|---|
| JP | 2011034344 A | 2/2011 |
| JP | 2011197954 A | 10/2011 |

OTHER PUBLICATIONS

Taguchi, Ono, Mita, Ida, "A Learning Method of Representative Examples for Image Super-Resolution by Closed-Loop Training", The Transactions of the Institute of Electronics, Information and Communication. D, information and systems J92-D(6), pp. 831-842, Jun. 1, 2009.

D. G. Lowe, "Object recognition from local scale-invariant features", Proc. of IEEE International Conference on Computer Vision (ICCV), pp. 1150-1157, Sep. 1999.

N. Dalal, B. Triggs, "Histograms of oriented gradients for human detection", Proc. of IEEE Conference on Computer Vision and Pattern Recognition (CVPR), pp. 886-893, 2005.

English Translation of written opinion for PCT Application No. PCT/JP2013/007144.

In Kwang et al.:"Example-based Learning for Single-Image Super-Resolution and JPEG Artifact Removal", Technical Report No. TR-173, Max-Planck Institute for Biological Cybernetics, Aug. 1, 2008, pp. 1-27, XP055193722.

Wen-Sen Yu et al.:"An Improved Neighbor Embedding Method to Super-resolution Reconstruction of a Single Image", Procedia Engineering, vol. 15, Aug. 2008, pp. 2418-2422, XP028337776.

Extended European Search Report for EP Application No. EP13860561.3 dated Sep. 20, 2016.

\* cited by examiner

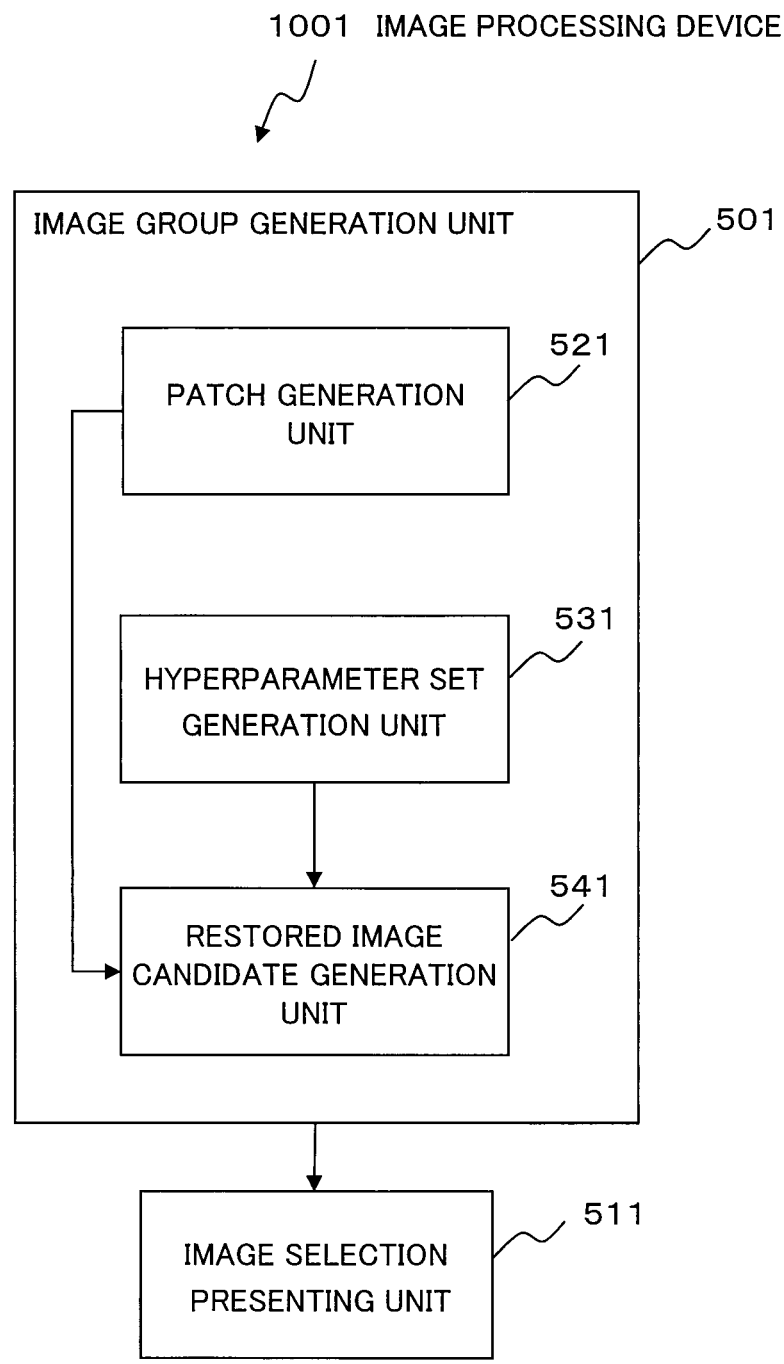

Fig.8

60 HYPERPARAMETER SET

| PATCH SIZE | MAGNITUDE OF BLUR | POSTURE | DISTANCE SPACE |
|---|---|---|---|
| 5 | 1 | 1 DEGREE IN X AXIS | L1 NORM |
| 5 | 1 | 1 DEGREE IN X AXIS | L2 NORM |
| 5 | 1 | -2 DEGREES IN Z AXIS | L1 NORM |
| 5 | 1 | -2 DEGREES IN Z AXIS | L2 NORM |
| 5 | 0.5 | 1 DEGREE IN X AXIS | L1 NORM |
| 5 | 0.5 | 1 DEGREE IN X AXIS | L2 NORM |
| 5 | 0.5 | -2 DEGREES IN Z AXIS | L1 NORM |
| 5 | 0.5 | -2 DEGREES IN Z AXIS | L2 NORM |
| 3 × 4 | 1 | 1 DEGREE IN X AXIS | L1 NORM |
| 3 × 4 | 1 | 1 DEGREE IN X AXIS | L2 NORM |
| 3 × 4 | 1 | -2 DEGREES IN Z AXIS | L1 NORM |
| 3 × 4 | 1 | -2 DEGREES IN Z AXIS | L2 NORM |
| 3 × 4 | 0.5 | 1 DEGREE IN X AXIS | L1 NORM |
| 3 × 4 | 0.5 | 1 DEGREE IN X AXIS | L2 NORM |
| 3 × 4 | 0.5 | 1 DEGREE IN X AXIS | L1 NORM |
| 3 × 4 | 0.5 | -2 DEGREES IN Z AXIS | L2 NORM |

IMAGE PROCESSING DEVICE AND IMAGE PROCESSING METHOD

This application is a National Stage Entry of PCT/JP2013/007144 filed on Dec. 5, 2013, which claims priority from Japanese Patent Application 2012-267402 filed on Dec. 6, 2012, the contents of all of which are incorporated herein by reference, in their entirety.

TECHNICAL FIELD

The present invention relates to an image processing device, an image processing method, and an image processing program for generating a restored image from a degraded image.

BACKGROUND ART

A known example of an art for generating a restored image from a degraded image includes a super resolution art. Among the super resolution arts, a method using a dictionary is especially referred to as a learning-type super resolution art. This dictionary is a dictionary generated by learning cases where a low resolution image and a high resolution image are associated with each other.

An example of a learning-type super resolution art is described in NPL 1. In the learning-type super resolution art described in NPL 1, the following scheme (hereinafter referred to as a super resolution process) is executed.

First, in the super resolution process, an input image which is a low resolution image is received.

Subsequently, in the super resolution process, a low frequency component is generated from the input image.

Subsequently, in the super resolution process, a low frequency patch is cut out from the generated low frequency component, and a low frequency feature amount is calculated from the low frequency patch.

Subsequently, in the super resolution process, multiple pieces of low frequency feature amount learning data are searched from the dictionary in the ascending order of the distance from the calculated low frequency feature amount. Then, in the super resolution process, high frequency feature amounts which form pairs with the searched low frequency feature amount learning data are read out.

Subsequently, in the super resolution process, a single high frequency feature amount is selected on the basis of the distance during the searching, inconsistency with an adjacent high frequency block, a co-occurrence probability of a low frequency feature amount and a high frequency feature amount learned separately in a learning stage, and the like.

For example, PTL 1 discloses an example of an image processing device.

In the image processing device of PTL 1, a parameter selection unit selects a combination of multiple different image processing parameters on the basis of an attribute of a subject identified from an input image. Subsequently, an image generation unit uses these selected image processing parameters to improve the image quality of the subject included in the input image. Then, the image generation unit selects at least a single image on the basis of comparison with the input image from among multiple images obtained from the image quality improvement, and makes the selected image into a high image quality image.

CITATION LIST

Patent Literature

[PTL 1] Japanese Patent Laid-Open No. 2010-273328

Non Patent Literature

[NPL1] Taguchi, Ono, Mita, Ida, "A Learning Method of Representative Examples for Image Super-Resolution by Closed-Loop Training", The Transactions of the Institute of Electronics, Information and Communication. D, information and systems J92-D(6), pp. 831-842, 2009-06-01

SUMMARY OF INVENTION

Technical Problem

However, in the arts described in PTL 1 and NPL 1 explained above, there is a problem in that a restored image accurately corresponding to an input image which is a low-quality image may not be output. This problem is more specifically the following problem. When the content included in the input image is, for example, a number '7', a number '9' which is different from the original content thereof may be output to the restored image, and the number '7' which is the original content thereof may not be output. This problem becomes more significant when the degradation of the input image (degradation of the image quality) is greater.

This is because, any of the arts described in PTL 1 and NPL 1 does not expect a case where 'a restored image generated corresponding to an input image may be incorrect'. In other words, any of the arts described in PTL 1 and NPL 1 does not have means for selecting multiple restored images which may possibly indicating the original content.

More specifically, this is because, in the art described in NPL 1, a super resolution image (restored image) corresponding to any given input image is generated from a high frequency component selected only in view of more greatly increasing the inconsistency from the input image.

On the other hand, this is because, in the art described in PTL 1 explained above, a high image quality image (restored image) corresponding to an input image is selected and output on the basis of comparison with the input image thereof from among multiple images made into high image quality.

It is an object of the present invention to provide an image processing device, an image processing method, and an image processing program solving the above problems.

Solution to Problem

A first image processing device according to one aspect of the present invention includes an image group generation unit that uses a dictionary storing a plurality of patch pairs including a degraded patch which is a patch of a degraded image obtained by degrading a predetermined image and a restored patch which is a patch of said predetermined image in such a manner that the degraded patch and the restored patch are associated with each other to generate a plurality of restored image candidates including a plurality of different contents that may be an original content of an input image from said single input image; and an image selection presenting unit that clusters said restored image candidates, and selecting and outputting said restored image candidate on the basis of said result of clustering.

A second image processing device according to one aspect of the present invention includes an image group generation unit that generates a plurality of restored image candidates including different contents similar to an input image; and an image selection presenting unit that clusters said restored image candidates, and selecting and outputting restored image candidates from at least two or more classes.

A first image processing method according to one aspect of the present invention executed by a computer, includes using a dictionary storing a plurality of patch pairs including a degraded patch which is a patch of a degraded image obtained by degrading a predetermined image and a restored patch which is a patch of said predetermined image in such a manner that the degraded patch and the restored patch are associated with each other to generate a plurality of restored image candidates including a plurality of different contents that may be an original content of an input image from said single input image; and clustering said restored image candidates, and selecting and outputting said restored image candidate on the basis of said result of clustering.

A second image processing method according to one aspect of the present invention executed by a computer, includes generating a plurality of restored image candidates including different contents similar to an input image; and clustering said restored image candidates, and selecting and output restored image candidates from at least two or more classes.

A first non-transitory computer-readable recording medium according to one aspect of the present invention recorded with an image processing program causing a computer to execute:

processing of using a dictionary storing a plurality of patch pairs including a degraded patch which is a patch of a degraded image obtained by degrading a predetermined image and a restored patch which is a patch of said predetermined image in such a manner that the degraded patch and the restored patch are associated with each other to generate a plurality of restored image candidates including a plurality of different contents that may be an original content of an input image from said single input image; and processing of clustering said restored image candidates, and selecting and outputting said restored image candidate on the basis of said result of clustering.

A second non-transitory computer-readable recording medium according to one aspect of the present invention recorded with an image processing program causing a computer to execute:

processing of generating a plurality of restored image candidates including different contents similar to an input image; and processing of clustering said restored image candidates, and selecting and outputting restored image candidates from at least two or more classes.

Advantageous Effects of Invention

The present invention has an advantage in that the probability of outputting a restored image which accurately corresponds to an original image which is included in an input image, i.e., a low-quality image can be improved.

BRIEF DESCRIPTION OF DRAWINGS

FIG. 7 is a block diagram illustrating a configuration of an image processing device according to the first exemplary embodiment.

FIG. 8 is a drawing illustrating an example of a hyper-parameter set according to the first exemplary embodiment.

DESCRIPTION OF EMBODIMENTS

Figure 1:
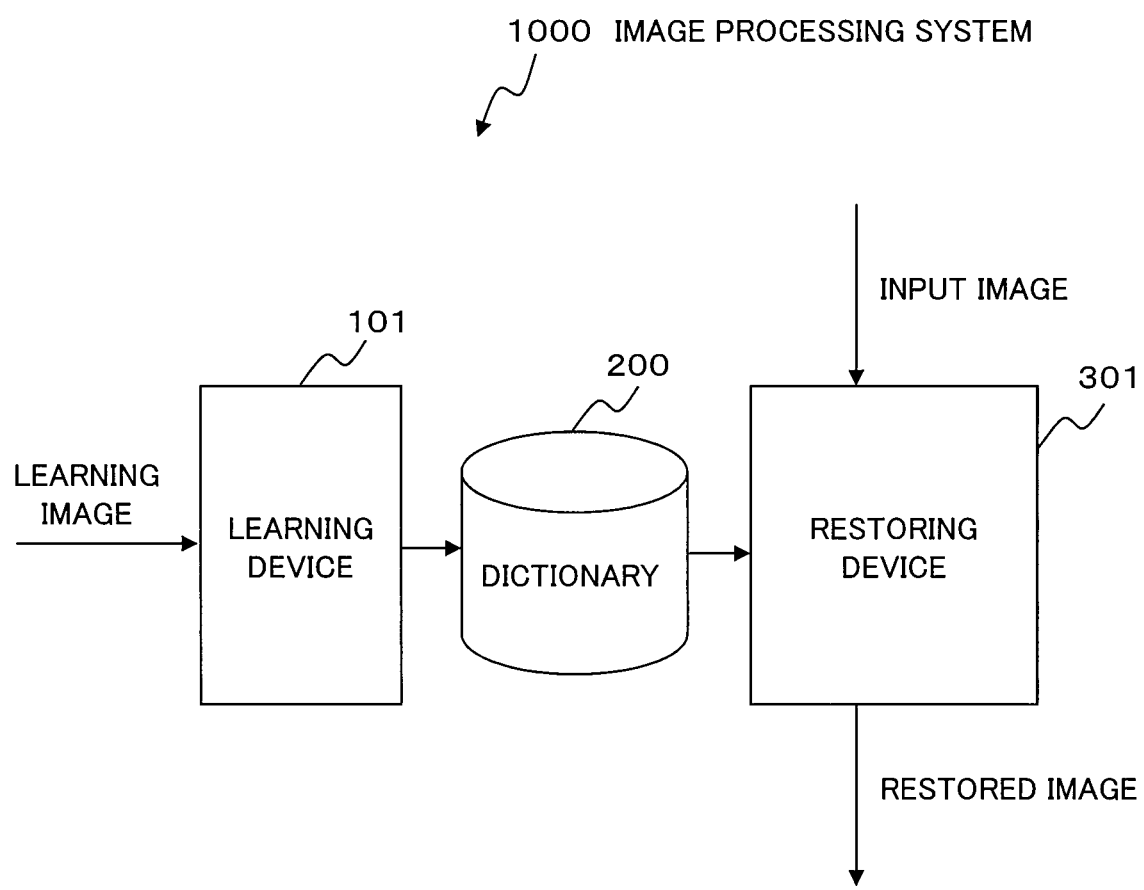
FIG. 1 is a block diagram illustrating a configuration of an image processing system according to a first exemplary embodiment of the present invention.

Subsequently, exemplary embodiments for carrying out the present invention will be hereinafter explained in details with reference to drawings. In each drawing and each exemplary embodiment described in the specification, the constituent elements having the same functions are denoted with the same reference numerals.

First, a background of the present invention will be explained in order to make it easy to understand the exemplary embodiments of the present invention. In the explanation below, a super resolution art is performed as an example, but the present invention is not limited to be applied to only the super resolution art. The present invention can be applied to any art for generating a restored image from a low quality input image, such as, e.g., noise reduction technique, image retouching technique, temporal resolution interpolation technique, blur reduction technique, and the like. It is to be noted that an input image of which quality is low (an input image of a low-quality image) is also referred to as a degraded image, but in the explanation below, it is simply referred to as an input image in order to be distinguished from a degraded image which is an image obtained by degrading a high-resolution image explained later.

The learning-type super resolution art includes a learning phase and a restoring phase.

The learning phase is a phase for learning multiple cases and generating a dictionary. The dictionary includes a patch pair in each case as dictionary data.

In this case, the patch pair is a pair of a patch of a high-resolution image and a patch of a degraded image in a predetermined case. This high-resolution image (hereinafter referred to as a learning image) is an image of a high resolution corresponding to the case. The degraded image is an image obtained by degrading the high-resolution image (learning image) thereof. In the explanation below, a patch of a learning image (high-resolution image) will be referred to as a restored patch, and a patch of a degraded image will be referred to as a degraded patch. A patch (for example, a restored patch thereof, a degraded patch thereof, and an input patch explained later) is a partial small region image of a target image. For example, this patch is generated by dividing the target image into blocks.

The restoring phase is a phase for searching an optimum restored patch corresponding to a patch of an input image which is a target of image processing (hereinafter referred to as an input patch) from a dictionary generated in the learning phase, and generating a super resolution image by composition processing. In this case, a generally-available input image is an image of which quality is low (low-quality image) which may be of a low resolution, may include noise mixed therein, may be partially damaged, or may partially lost. The input image is also an image of which quality is low (low-quality image) which may include blur or of which posture is inclined. On the other hand, the super resolution image is also referred to as a restored image.

The background of the present invention has been hereinabove explained.

First Exemplary Embodiment

FIG. 1 is a block diagram illustrating a configuration of an image processing system 1000 according to the first exemplary embodiment.

As shown in FIG. 1, the image processing system 1000 according to the first exemplary embodiment includes a learning device 101, a dictionary 200, and a restoring device 301. The learning device 101 receives a learning image, and executes a learning phase. The dictionary 200 stores a patch pair generated in the learning phase. The restoring device 301 receives an input image, executes restoring phase using the dictionary 200, and outputs the restored image.

Hereinafter, the present exemplary embodiment will be described by separately explaining each of the learning phase and the restoring phase.

(Learning Phase)

The learning phase according to the first exemplary embodiment will be explained with reference to FIGS. 2 to 5.

Figure 2:
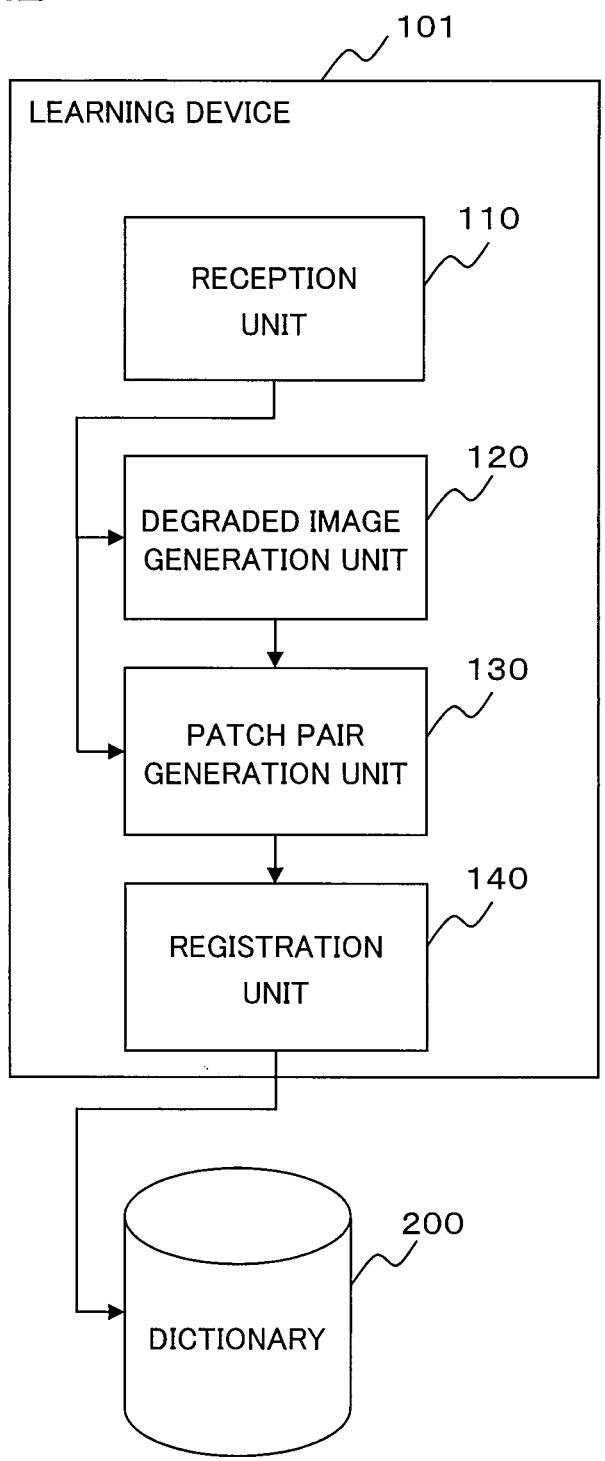
FIG. 2 is a block diagram illustrating a configuration of a learning device according to the first exemplary embodiment.

FIG. 2 is a block diagram illustrating a configuration of the learning device 101. As shown in FIG. 2, the learning device 101 includes a reception unit 110, a degraded image generation unit 120, a patch pair generation unit 130, and a registration unit 140.

The learning device 101 generates a dictionary 200 by executing the learning phase.

===Reception Unit 110===

The reception unit 110 receives a learning image from the outside. The reception unit 110 outputs the learning image received from the outside to the degraded image generation unit 120 and the patch pair generation unit 130.

===Degraded Image Generation Unit 120===

The degraded image generation unit 120 generates a degraded image by applying degrading processing to the learning image which is output from the reception unit 110.

The degraded image generation unit 120 may generate multiple degraded images by applying multiple pieces of degrading processing to the learning image which is output from the reception unit 110. The degraded image generation unit 120 may generate multiple degraded images by applying multiple different pieces of degrading processing to the learning image.

The degraded image generation unit 120 may generate a degraded image by applying at least one of pieces of processing including size reduction, lightness decrease high frequency component reduction, or posture change to the learning image which is output from the reception unit 110.

The degraded image generation unit 120 may generate a degraded image by reducing the learning image received from the reception unit 110 into, for example, one N-th. For example, nearest neighbor method of which image quality degradation is relatively high is used as the algorithm for reducing an image. For example, bilinear method, or bicubic method may use as the algorithm for reducing an image.

The degraded image generation unit 120 may generate a degraded image by, for example, removing a high frequency component of a learning image and increasing the blur intensity. The degraded image generation unit 120 may generate a degraded image by inclining the learning image and changing the posture. Alternatively, the degraded image generation unit 120 may generate a degraded image by decreasing the brightness value of the learning image and reducing the lightness. The degraded image generation unit 120 may generate a degraded image according to already-available various kinds of schemes.

The degraded image generation unit 120 outputs the generated degraded image as well as a parameter indicating a degraded state of an image with regard to the degraded image (hereinafter referred to as 'degrading parameter') to the patch pair generation unit 130. In this case, the degrading parameter may be a parameter representing, as a numerical value, at least one of the magnification rate, lightness, blur intensity of the image, and the inclination of the posture for each of the regions of the image.

===Patch Pair Generation Unit 130===

The patch pair generation unit 130 receives a learning image from the reception unit 110, and receives the degraded image of the learning image and the degrading parameter of the degraded image from the degraded image generation unit 120. The patch pair generation unit 130 generates multiple patch pairs at the positions where the learning image and the degraded image are corresponding to each other. In other words, patch pair generation unit 130 makes a patch pair which includes a particular patch of the learning image and a patch of the degraded image at the position on the degraded image corresponding to the position of the particular patch on the learning image.

The patch pair generation unit 130 may generate multiple pairs (patch pairs) of restored patches and degraded patches in accordance with an already-available scheme.

The patch pair generation unit 130 outputs the generated multiple patch pairs as well as corresponding degrading parameters to the registration unit 140.

It is to be noted that the reception unit 110 of the learning device 101 may receive a learning image and a degraded image paired with the learning image and a degrading parameter from the outside. For example, the learning image is an image captured by a camera capable of capturing a high-resolution image, and the degraded image is an image captured by a camera of a low performance (an image having a high magnification rate of an image of a degrading parameter). Alternatively, the degraded image may be an image captured by intentionally defocusing (increasing the blur intensity of the degrading parameter), or incorrectly setting the exposure time (changing the lightness of the degrading parameter). It is to be noted that the degraded image may be an image captured by generating blur (an inclination of a posture of a degrading parameter). The degraded image may be an image captured under other conditions including various kinds of bad conditions. In these cases, the learning device 101 may not include the degraded image generation unit 120. The patch pair generation unit 130 may receive the learning image and the degraded image from the reception unit 110.

===Registration Unit 140===

The registration unit 140 may receive multiple patch pairs from the patch pair generation unit 130. The registration unit 140 registers multiple patch pairs and degrading parameters of the degraded patches of the patch pairs to the dictionary 200 in such a manner that the multiple patch pairs and the degrading parameters of the degraded patches of the patch pairs are associated with each other.

===Dictionary 200===

The dictionary 200 stores multiple patch pairs and degrading parameters generated by the learning device 101.

Figure 3:
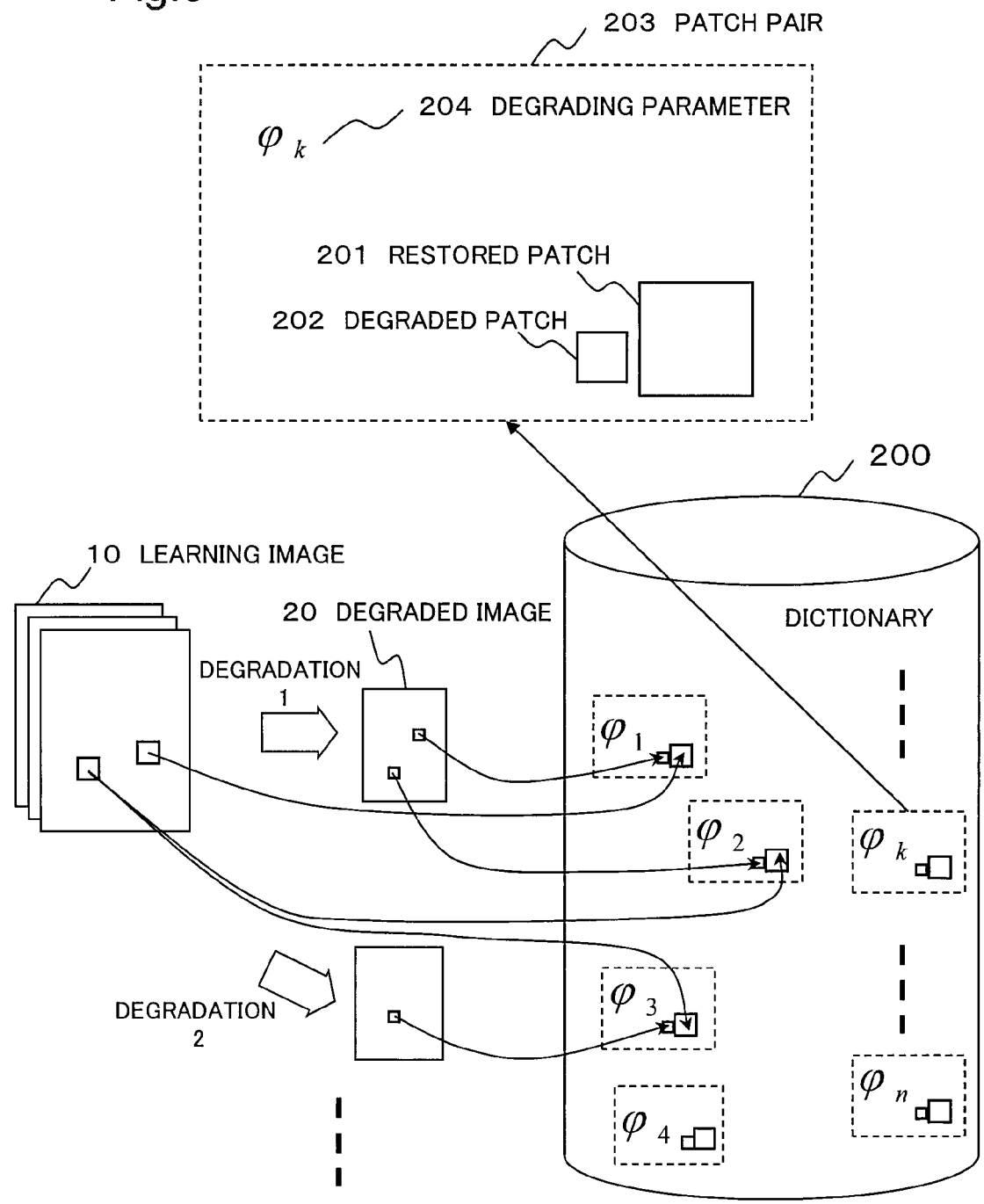
FIG. 3 is a schematic diagram for explaining learning phase according to the first exemplary embodiment.

FIG. 3 is a schematic diagram for explaining the learning phase according to the first exemplary embodiment. As shown in FIG. 3, the learning device 101 may generate a degraded image 20 by applying one or more pieces of degrading processing to the learning image 10. FIG. 3 indicates that degrading processing is performed with a variation of 'degradation 1', 'degradation 2', . . . , and the like. The learning device 101 registers a pair of patches at the position where the learning image 10 and the degraded image 20 correspond to each other as well as the degrading parameter 204 to the dictionary 200. FIG. 3 indicates that the learning device 101 registers the patch pair 203 including the restored patch 201, the degraded patch 202, and the degrading parameter 204 to the dictionary 200. The degrading parameter 204 is indicated by ψk (k is an integer from one to n).

Figure 4:
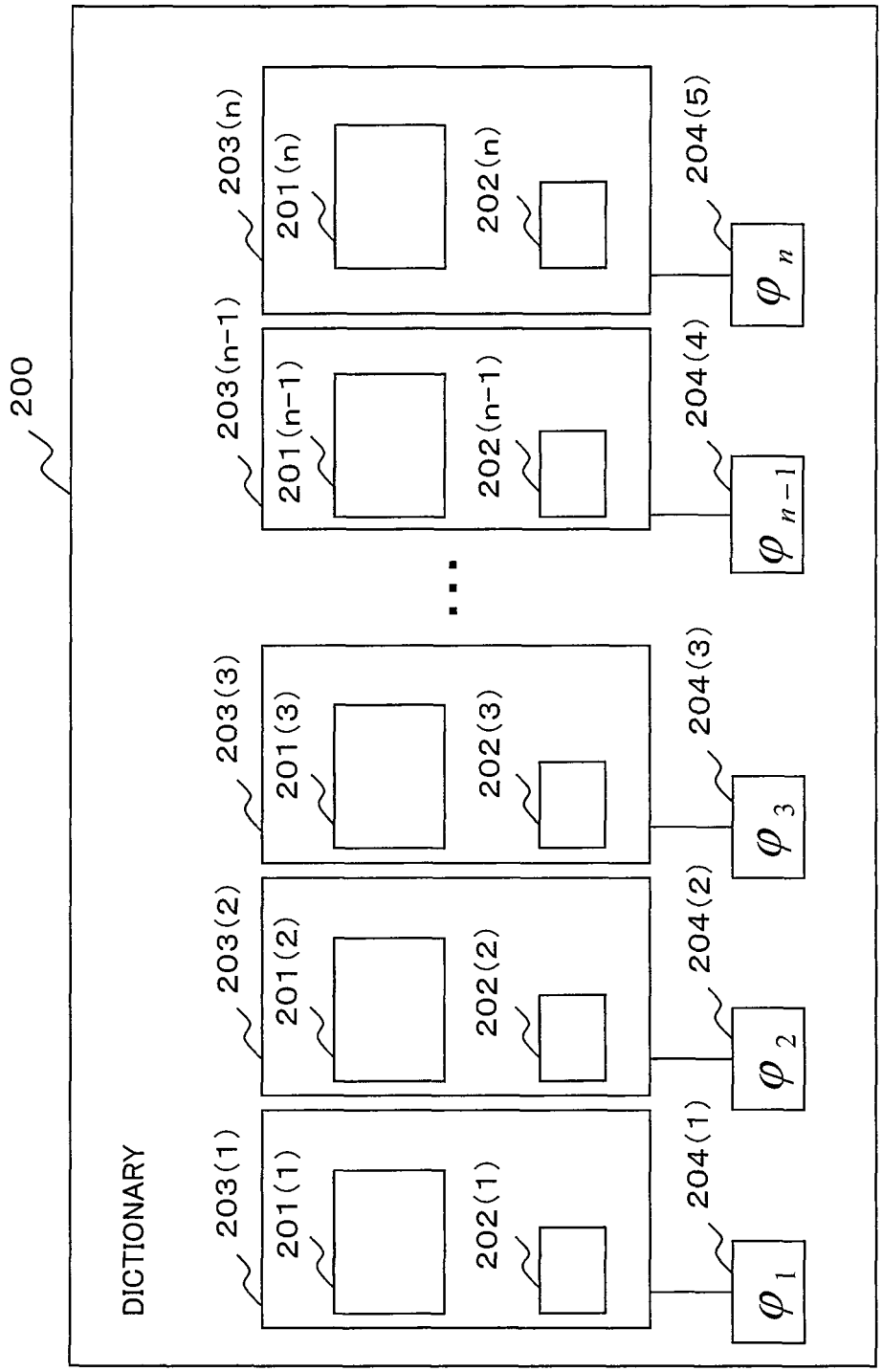
FIG. 4 is a schematic diagram for explaining how a dictionary stores patch pairs according to the first exemplary embodiment.

FIG. 4 is a schematic diagram for explaining how the dictionary 200 stores the patch pairs 203 and the degrading parameters. As shown in FIG. 4, the dictionary 200 stores restored patches 201(1), 201(2), 201(3), . . . , 201(n−1), 201(n). The dictionary 200 stores the degraded patches 202(1), 202(2), 202(3), . . . , 202(n−1), 202(n) in association with the restored patches 201. More specifically, the dictionary 200 stores the patch pairs 203(1), 203(2), 203(3), . . . , 203(n−1), 203(n) each of which is a pair of the restored patch 201 and the degraded patch 202. The dictionary 200 stores the degrading parameters 204(1), 204(2), 204(3), . . . , 204(n−1), 204(n) in association with the patch pairs 203. In this case, n denotes a positive integer.

The method of the dictionary 200 for storing the restored patches, the degraded patches, and the degrading parameters is not limited to the method for storing the patches in association with each other as shown in FIG. 4. For example, the dictionary 200 may store the learning image 10 not as a patch but as a single image. In this case, the dictionary 200 may store learning data in such a manner that an index is attached thereto, or may store learning data in accordance with other methods. This index indicates which region of the restored image it corresponds to for each of the degraded patches and what kind of degrading parameter it corresponds to. In this case, the structure of the patch and the degrading parameter may be a structure in conformity with the storage method of the learning data of the dictionary 200.

Figure 5:
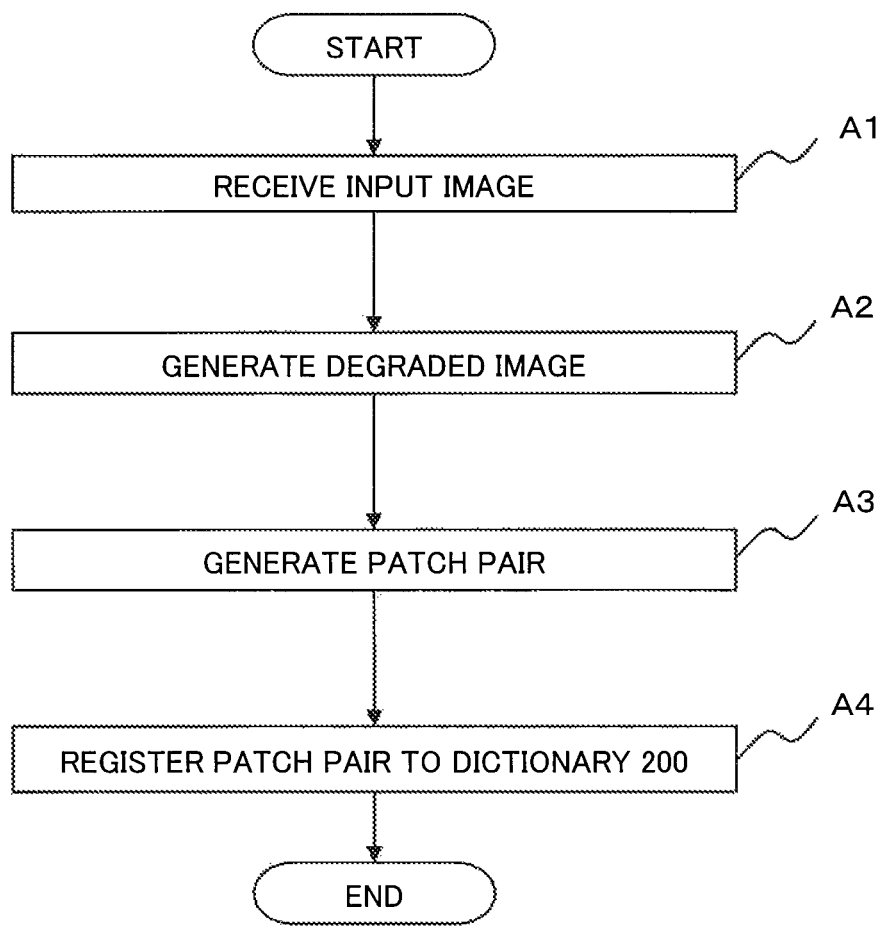
FIG. 5 is a flowchart illustrating operation of a learning device according to the first exemplary embodiment.

Subsequently, operation of the learning device 101 will be hereinafter explained with reference to drawings. FIG. 5 is a flowchart illustrating operation of a learning device 101.

The reception unit 110 receives the learning image 10 from the outside (step A1).

The degraded image generation unit 120 generates the degraded image 20 by reducing the learning image 10 output from the reception unit 110 into, for example, one N-th (step A2).

The patch pair generation unit 130 generates multiple patch pairs 203 at the positions where the learning image 10 and the degraded image 20 are corresponding to each other, and outputs the patch pairs to the registration unit 140 (step A3).

Subsequently, the registration unit 140 registers the patch pairs 203 received from the patch pair generation unit 130 to the dictionary 200 (step A4).

The operation of the learning device 101 for generating the dictionary 200 has been hereinabove explained.

(Restoring Phase)

The restoring phase according to the first exemplary embodiment will be explained with reference to FIGS. 6 to 12.

Figure 6:
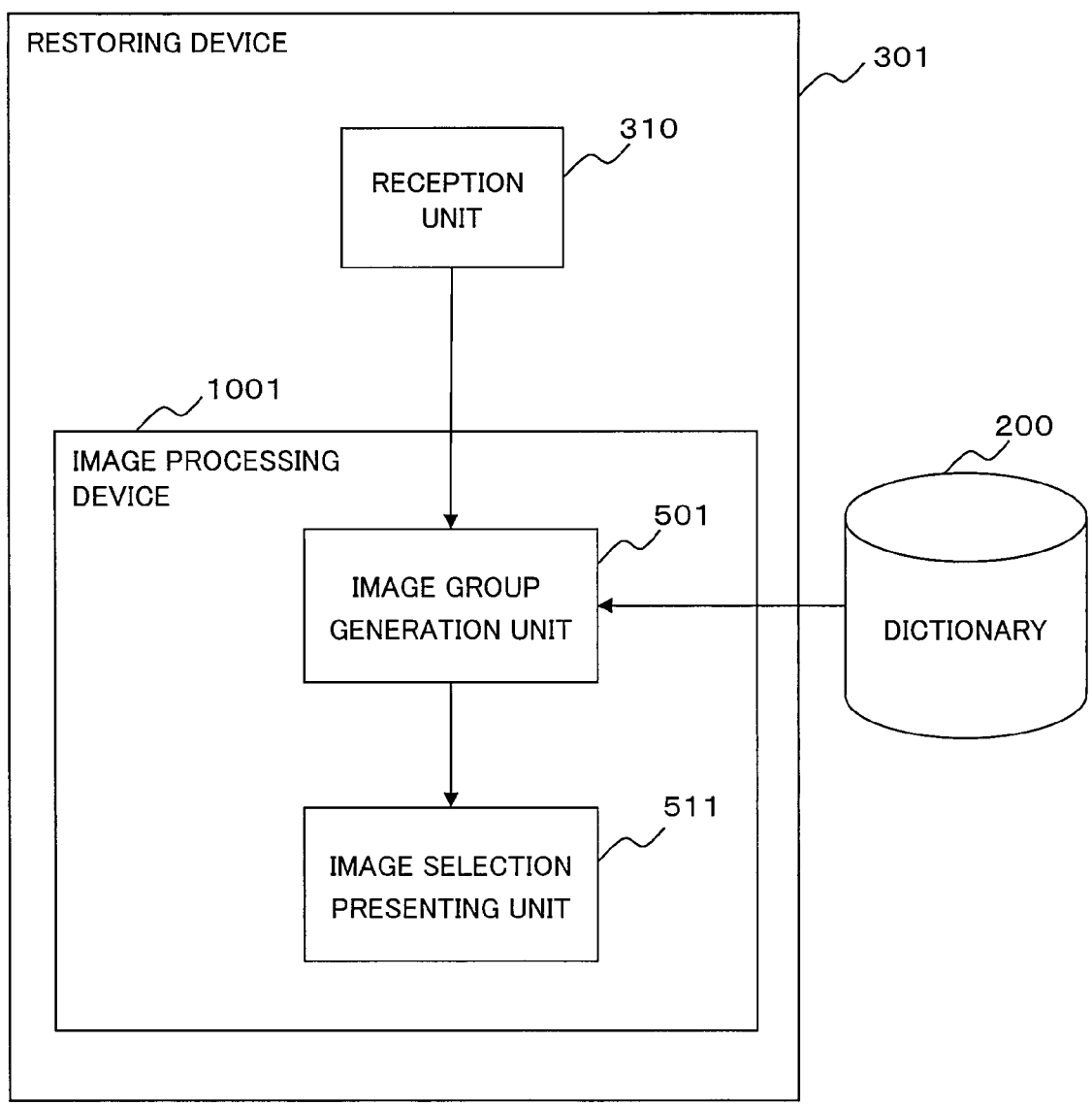
FIG. 6 is a block diagram illustrating a configuration of a restoring device according to the first exemplary embodiment.

FIG. 6 is a block diagram illustrating a configuration of the restoring device 301. As shown in FIG. 6, the restoring device 301 includes a reception unit 310 and an image processing device 1001. The image processing device 1001 includes an image group generation unit 501 and an image selection presenting unit 511.

FIG. 7 is a block diagram illustrating a configuration of the image processing device 1001. The image group generation unit 501 of the image processing device 1001 includes a patch generation unit 521, a hyperparameter set generation unit 531, and a restored image candidate generation unit 541.

The restoring device 301 receives an input image, which is the target of the image processing, from the outside, and executes image processing on the input image (the first to the third processing performed by the restoring device 301 shown below), thus generating a restored image.

In the first processing, the restoring device 301 uses the dictionary 200 to generate multiple restored image candidates for a single input image thus received, on the basis of a probability distribution function. In this case, a restored image candidates is a super resolution image including any one of multiple different contents (images). Each of these different contents (images) is a content that may be the original content (image) of the input image. The details of the probability distribution function will be explained later.

In the second processing, the restoring device 301 clusters the multiple restored image candidates. Subsequently, the restoring device 301 selects one or more multiple restored image candidates from among the multiple restored image candidates on the basis of the clustered result. In this case, the restoring device 301 may select a restored image candidate in accordance with a selection condition determined in advance.

In the third processing, the restoring device 301 outputs the selected restored image candidate as a restored image.

Subsequently, each constituent element of the restoring device 301, the image processing device 1001, and the image group generation unit 501 will be explained in details.

===Reception Unit 310===

The reception unit 310 of the restoring device 301 receives an input image, which is the target of the image processing, from the outside. For example, the reception unit 310 may connect to a network and receive an input image, or may read an input image from a memory storing the input image and receive the input image. More specifically, how an input image is received by the reception unit 310 is not limited. The reception unit 310 outputs the received input image to the image group generation unit 501.

===Patch Generation Unit 521===

The patch generation unit 521 of the image group generation unit 501 generates multiple patches (input patches) from the input image which is output from the reception unit 310, and outputs the patches to the restored image candidate generation unit 541.

===Hyperparameter Set Generation Unit 531===

The hyperparameter set generation unit 531 of the image group generation unit 501 generates multiple hyperparameter sets including one or more multiple hyperparameters (degrading parameters). More specifically, the hyperparameter determination unit 531 generates multiple hyperparameter sets in which the values of the hyperparameters are changed. Subsequently, the hyperparameter determination unit 531 outputs the generated multiple hyperparameter sets to the restored image candidate generation unit 541.

The hyperparameter can also said to be a parameter for determining the probability distribution function in the field of statistics. More specifically, in the present exemplary embodiment, the degrading parameter can also said to be corresponding to the hyperparameter.

FIG. 8 is a drawing illustrating an example of the hyperparameter set 60. As shown in FIG. 8, the hyperparameter set 60 is any given combination of, for example, the patch size, the magnitude of blur, the posture, and the distance space of the hyperparameter. The patch size is a value indicated by the number of pixels (5 pixels, 3 by 4 pixels, and the like). The magnitude of the blur is a value indicated by the number of pixels (1 pixels, 0.5 pixels, and the like). The posture is, for example, a value indicated the rotation axis and the angle (one degree in the x axis and −2 degrees in the z axis). The distance space is a distance spaced used for patch search. The distance space is indicated as, for example, L1 norm and L2 norm.

For example, the hyperparameter set generation unit 531 generates the hyperparameter set 60 on the basis of a command given by an interface, not shown. The hyperparameter set generation unit 531 may generate the hyperparameter set 60 on the basis of an operator's command which is input from means, not shown.

===Restored Image Candidate Generation Unit 541===

The restored image candidate generation unit 541 of the image group generation unit 501 generates a restored image candidate in accordance with the following first method.

The restored image candidate generation unit 541 calculates the maximum value of the maximum value, for example, as shown in the equation 1 explained below. Subsequently, the restored image candidate generation unit 541 selects a patch pair 203 in the dictionary 200 corresponding to the maximum value of the probability distribution function. Subsequently, the restored image candidate generation unit 541 generates a restored image candidate by comparing the restored patch 201 of the selected patch pair 203. It is to be noted that the comparison of the restored patch 201 will be explained in details in the restoring phase of the second method explained later.

Figure 9:
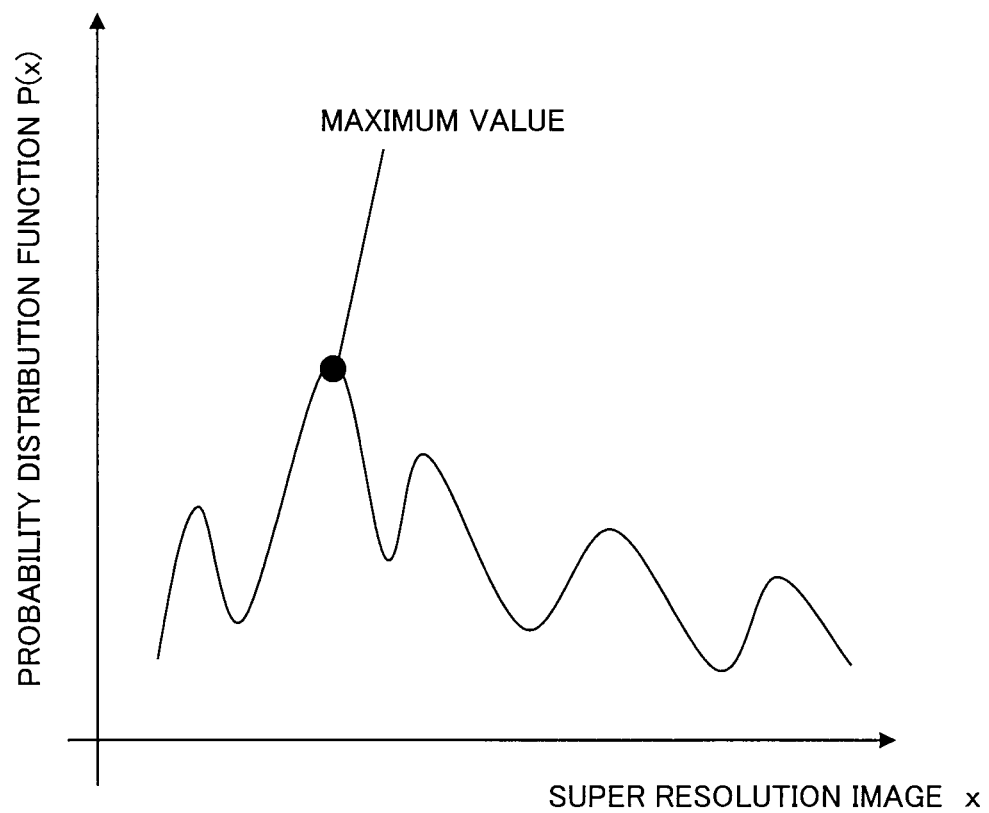
FIG. 9 is a drawing schematically illustrating a probability distribution function and an image of the maximum value thereof.

FIG. 9 is a drawing schematically illustrating the probability distribution function of the equation 1 and the image of the maximum value thereof.

The restored image candidate generation unit 541 uses, for example, Monte Carlo method to derive the maximum value of the probability distribution function. The Monte Carlo method may be Markov chain Monte Carlo (Metropolis method, Gibbs sampling), multicanonical Monte Carlo method, exchange Monte Carlo method, and the like. The restored image candidate generation unit 541 may use those other than the Monte Carlo method (for example, EM (Expectation Maximization) algorithm).

$$P(x|\alpha)=\exp(-E_{data}+\alpha E_{smooth}) \quad \text{(Equation 1)}$$

The equation 1 is a probability distribution function indicating the probability of occurrence of a super resolution image (an image that can be restored image candidate. The probability distribution function of the equation 1 is a function made by modeling the relationship of the input image, the super resolution image corresponding to the input image, and the patch pair 203 stored in the dictionary 200 and the relationship of adjacent patches of the super resolution image. The function of the equation 1 includes, as a hyper parameter, any give degraded parameters corresponding to the degraded image 20.

More specifically, in the equation 1, $E_{data}$ is a value indicating the similarity of the input patch and the degraded patch 202 (for example, similarity of the distance space of each of the input patch and the degraded patch 202). $E_{smooth}$ is a value indicating the similarity of adjacent patches of the super resolution image. It is to be noted that $E_{smooth}$ may also be the similarity of the patch that is cut out from the super resolution image and the restored patch 201.

In the equation 1, $\alpha$ is a value for determining the weight of $E_{smooth}$, and is one of the hyperparameters. It is to be noted that the hyperparameters are included as the patch size, the magnitude of the blur, the posture, or the distance space used for the patch search not only in a but also in $E_{data}$ and $E_{smooth}$.

Subsequently, the restored image candidate generation unit 541 generates, as the restored image candidate, a super resolution image corresponding to the probability of occurrence of the maximum value.

In other words, the equation 1 is a probability distribution function of the super resolution image X when the super resolution image is given as energy shown in the equation 2.

$$E = E_{data} + \alpha E_{smooth} \quad \text{(Equation 2)}$$

$$E_{data} = \sum_k d_{metric}(x_k, x_{LRi}) = \|x_k - x_{LRi}\|_2^2 \quad \text{(Equation 3)}$$

$$E_{smooth} = \sum_k \|\langle x_k \rangle - x_{HRi}\|_2^2 \quad \text{(Equation 4)}$$

where
$X_k$ denotes the input patch 31,
$X_{LRi}$ denotes the i-th degraded patch 202,
$X_{HRi}$ denotes the i-th restored patch 201, and
$\langle X_k \rangle$ denotes the k-th patch that is cut out from the restored image.

It is to be noted that the super resolution image corresponding to the probability of occurrence of the maximum value is a super resolution image of which energy indicated by the equation 2 is the minimum value. More specifically, 'the restoring device 301 generates multiple restored image candidates for the single received input image on the basis of the probability distribution function', which can be paraphrased as follows.

The restored image candidate generation unit 541 calculates the minimum value of the energy E derived by the calculation equation like the equation 2. Subsequently, the restored image candidate generation unit 541 generates, as a restored image candidate, a super resolution image corresponding to the energy E of the minimum value. In this manner, the restored image candidate generation unit 541 generates restored image candidate respectively corresponding to the hyperparameter set 60 as shown in FIG. 8.

The restored image candidate generation unit 541 may also generate multiple restored image candidates in accordance with the second method explained below. In the following second method, the image group generation unit 501 may not have the hyperparameter set generation unit 531.

The restored image candidate generation unit 541 selects multiple restored patches 201 respectively corresponding to the input patch on the basis of the similarity degree from among the patch pairs 203 stored in the dictionary 200. The similarity degree is a value representing the similarity of the input patch and the degraded patch 202. For example, the restored image candidate generation unit 541 selects the restored patch 201 corresponding to the degraded patch 202 of which similarity degree with the input patch is equal to or more than a predetermined value. The restored image candidate generation unit 541 selects a predetermined number of restored patches 201 corresponding to the degraded patches 202 in the descending order of the similarity degree with respect to the input patch.

The restored image candidate generation unit 541 compares the multiple restored patches 201 and generates the restored image candidates. Each of these restored patches 201 is one of multiple restored patches 201 respectively corresponding to the input patch.

Then, the restored image candidate generation unit 541 changes a combination of these composted restored patches 201, and generates multiple restored image candidates.

Figure 10:
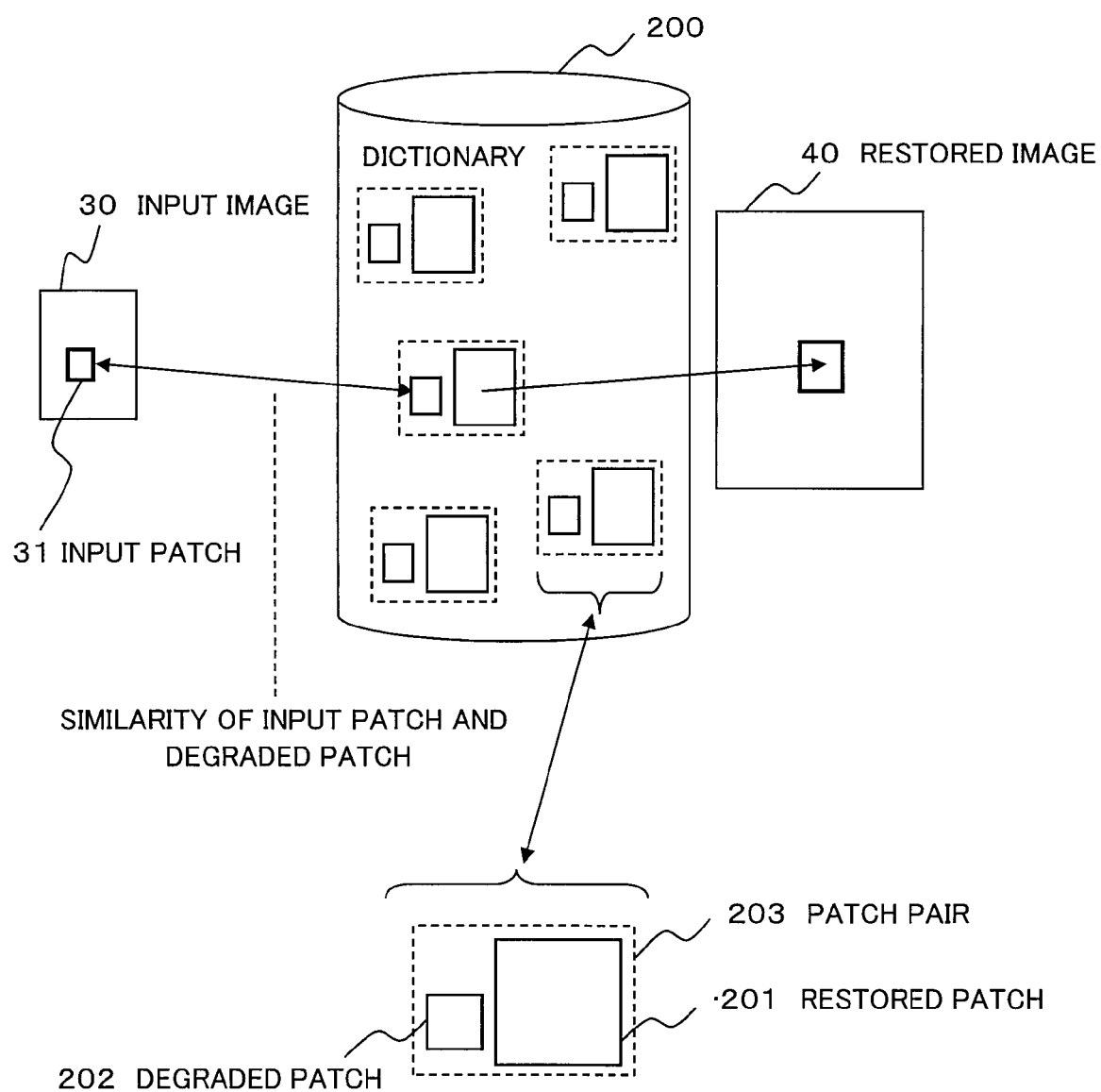
FIG. 10 is a schematic diagram for explaining a restoring phase according to the first exemplary embodiment.

FIG. 10 is a schematic diagram for explaining a restoring phase of the second method. As shown in FIG. 10, the restoring device 301 selects the restored patch 201 on the basis of the similarity of the input patch 31 of the input image 30 and the degraded patch 202 in the dictionary 200 (first similarity degree).

Figure 11:
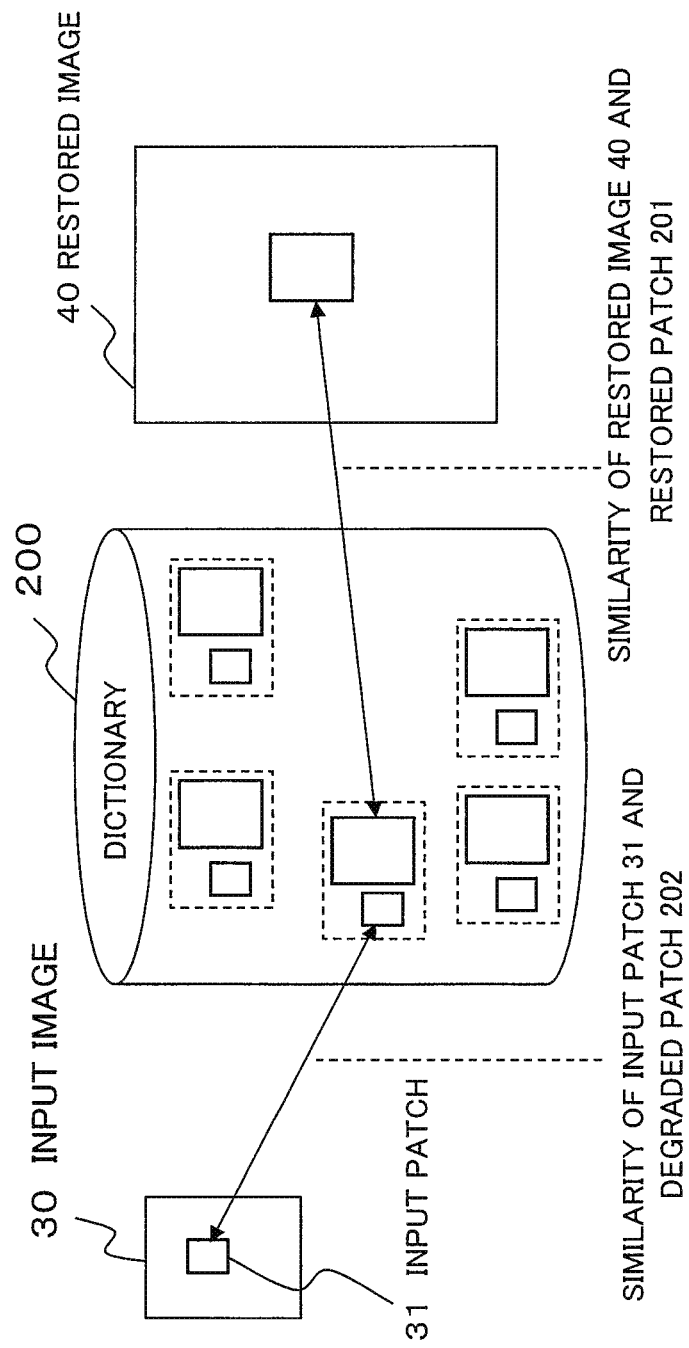
FIG. 11 is a schematic diagram for explaining a restoring phase according to the first exemplary embodiment.

The restoring device 301 may select the restored patch 201 on the basis of not only the first similarity degree but also the similarity of the patch cut out from the restored image 40 and the restored patch 201 as shown in FIG. 11.

Subsequently, a similarity degree of two patches (for example, the input patch 31 and the degraded patch 202) will be explained.

Figure 12:
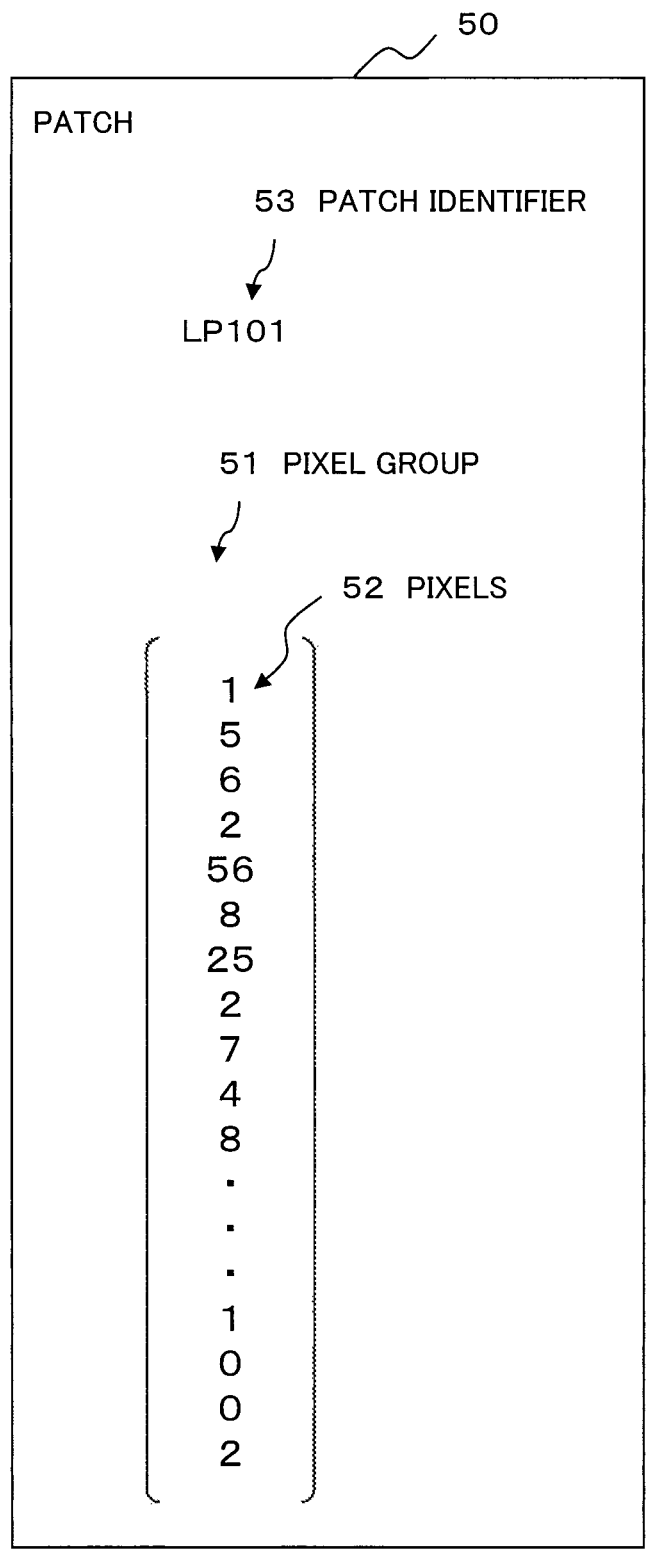
FIG. 12 is a drawing illustrating an example of a patch according to the first exemplary embodiment.

FIG. 12 is a drawing illustrating an example of the patch 50. As shown in FIG. 12, for example, the patch 50 includes a pixel group 51 which is a multidimensional vector having pixel values of multiple pixels 52 as elements. The patch 50 also includes a patch identifier 53 for individually identifying the patch 50 as meta-information. It is to be noted that the patch 50 is a concept including the restored patch 201, the degraded patch 202, and the input patch 31. The pixel value may be a brightness value and is not limited thereto.

In this case, the value indicating the similarity degree of the two patches is a value based on a difference of the brightness value of each pixel 52 of the patches. For example, the value indicating the similarity degree of the two patches may be a SSD (Sum of Square Distance) which is a sum of squares of the differences of the brightness values of the pixels 52 between the patches. For example, the value indicating the similarity degree may be a value obtained by subtracting the SSD from a particular constant. In this case, the particular constant may be, for example, an SSD of the patch of the minimum brightness and the patch of the maximum brightness. The value indicating the similarity degree between the two patches may be a value based on a SAD (Sum of Absolute Distance) which is a sum of absolute values of differences of the brightness values of the pixels 52 between the patches. For example, the value indicating the similarity degree may be a value obtained by subtracting the SAD from a particular constant. In this case, the particular constant may be, for example, an SAD of the patch of the minimum brightness and the patch of the maximum brightness.

Alternatively, for example, the value indicating the similarity degree between the two patches may be a value based on an angle between the two feature vectors. Still alternatively, the value indicating the similarity degree between the two patches may be a value calculated by a normalized cross-correlation function and is not limited thereto.

More specifically, the value indicating the similarity degree between the two patches is a similarity degree of images represented by the pixel groups 51 of the two patches.

===Image Selection Presenting Unit 511===

The image selection presenting unit 511 of the image processing device 1001 clusters multiple restored image candidates generated by the image group generation unit 501. The image selection presenting unit 511 performs clustering using, for example, K-means method and Ward method.

Figure 13:
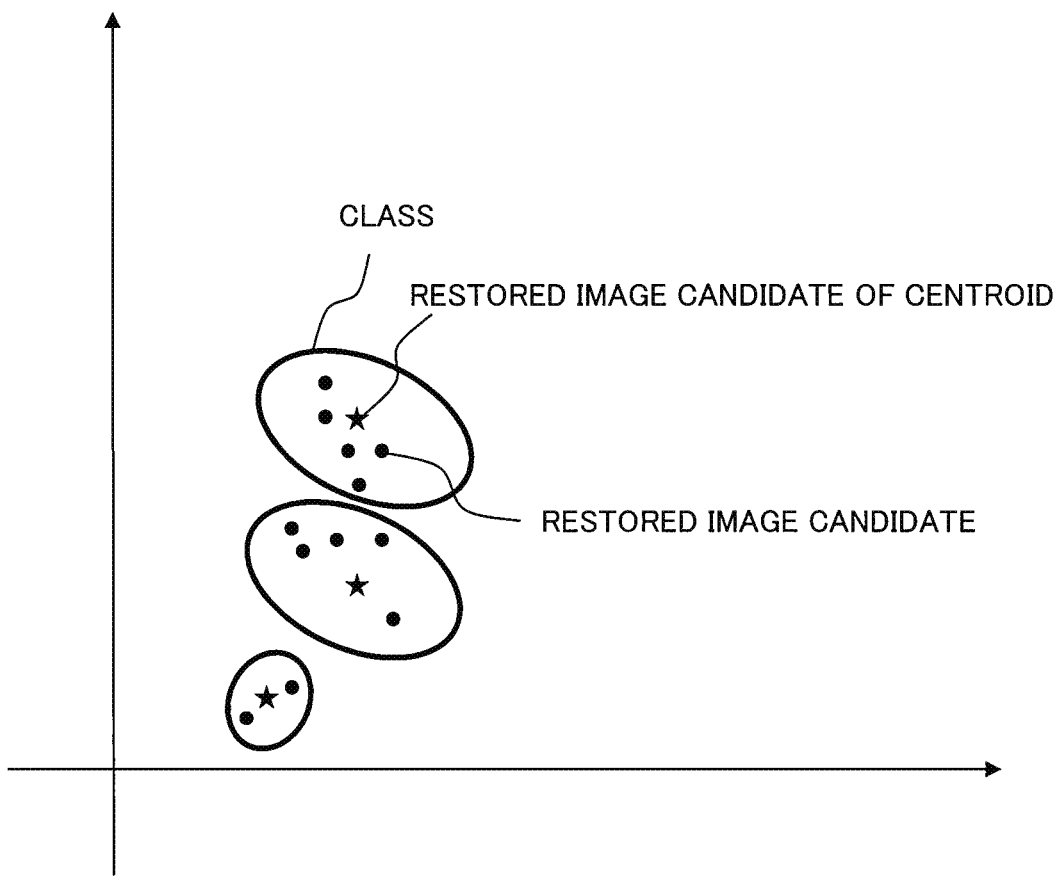
FIG. 13 is a drawing schematically illustrating an image of clustering.

FIG. 13 is a drawing schematically illustrating an image of clustering. The restored image candidate is a multidimensional vector having a power as many as the number of pixels constituting the restored image candidate. However, in FIG. 13, the restored image candidate is plotted on a two-dimensional plane.

In FIG. 13, black points and star marks are restored image candidates. A line enclosing the black points and the star marks represent a class. More specifically, the black points and the star marks enclosed by a line of a class are a subset of restored image candidates of a clustered result. The star mark is a restored image candidate of a centroid of the class in question. In this case, the restored image candidate of the centroid is a restored image candidate closest to the center of the class. In the following processing, the image selection presenting unit 511 may use, as a restored image candidate, a vector (image) corresponding to the center of the class instead of a restored image candidate of a centroid.

Subsequently, the image selection presenting unit 511 uses the result of the clustering to select a restored image candidate in conformity with a selection condition determined in advance. Then, the image selection presenting unit 511 outputs the selected restored image candidate as a restored image. For example, the selection condition may be given from the outside via an interface, not shown. The selection condition may be given with input means, not shown, by an operator.

For example, the selection condition is restored image candidates of centroids of the classes as many as the designated amount n (where n is a natural number equal to or more than one). In this case, the image selection presenting unit 511 randomly selects as many restored image candidates as the amount n from the restored image candidates of the centroids of the classes. For example, where n is '3', the image selection presenting unit 511 selects the restored image candidates of the centroids from three classes, and outputs the selected three restored image candidates as restored images.

Figure 14:
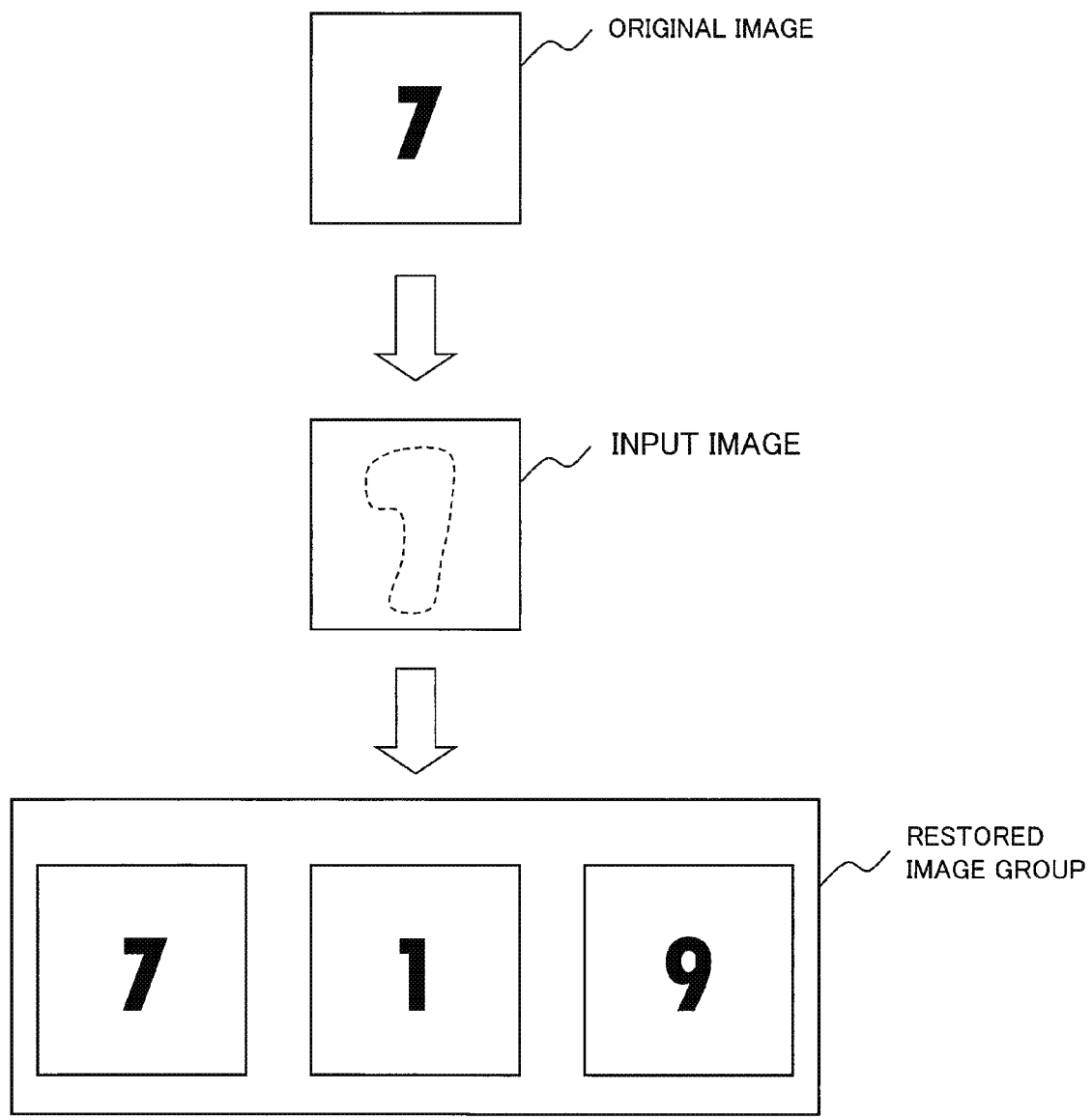
FIG. 14 is a drawing illustrating an example of a relationship of an original image, an input image, and a restored image group.

FIG. 14 is a drawing illustrating a relationship of an original image, an input image obtained by degrading the original image, and a restored image of the input image. FIG. 14 shows that the input image as shown in FIG. 14 is made into a low-quality image due to some elements (for example, blur, reduction of resolution, mixing of noise, and the like) using a dotted line. The restored image group as shown in FIG. 14 corresponds to, for example, restored image candidates of centroids indicated by the star marks in FIG. 13.

Therefore, the image processing device 1001 outputs not only the incorrect restored images ('1' and '9' in this case) but also the accurately corresponding restored image ('7' in this case) with regard to the original image (in this case, '7') included in the input image.

The selection condition is restored image candidates of centroids of the classes as many as the designated amount n (where n is a natural number equal to or more than one) in the descending order of the number of elements in the classes. In this case, the image selection presenting unit 511 selects as many restored image candidates as the amount n in the descending order of the number of elements in the classes from the restored image candidates of the centroids of the classes.

This selection condition may be restored image candidates of centroids of the classes of which number of elements is equal to or more than a threshold value. In this case, the image selection presenting unit 511 selects restored image candidates of centroids of the classes of which number of elements is equal to or more than the threshold value.

This selection condition may be restored image candidates of centroids of all the classes. In this case, the image selection presenting unit 511 selects restored image candidates of centroids of all the classes.

The image selection presenting unit 511 may cut out, as a particular portion restored image candidate, a particular portion of each of the restored image candidates, and cluster the articular portion restored image candidates. In this case, the image selection presenting unit 511 selects a particular portion restored image candidate in conformity with the above selection condition from these particular portion restored image candidates. Then, the image selection presenting unit 511 may output, as a restored image, a restored image candidate corresponding to the selected particular portion restored image candidate or the selected particular portion restored image candidate.

Each constituent element of the restoring device 301 and the image processing device 1001 has been hereinabove explained.

Subsequently, operation of the restoring device 301 will be explained in details with reference to drawings.

Figure 15:
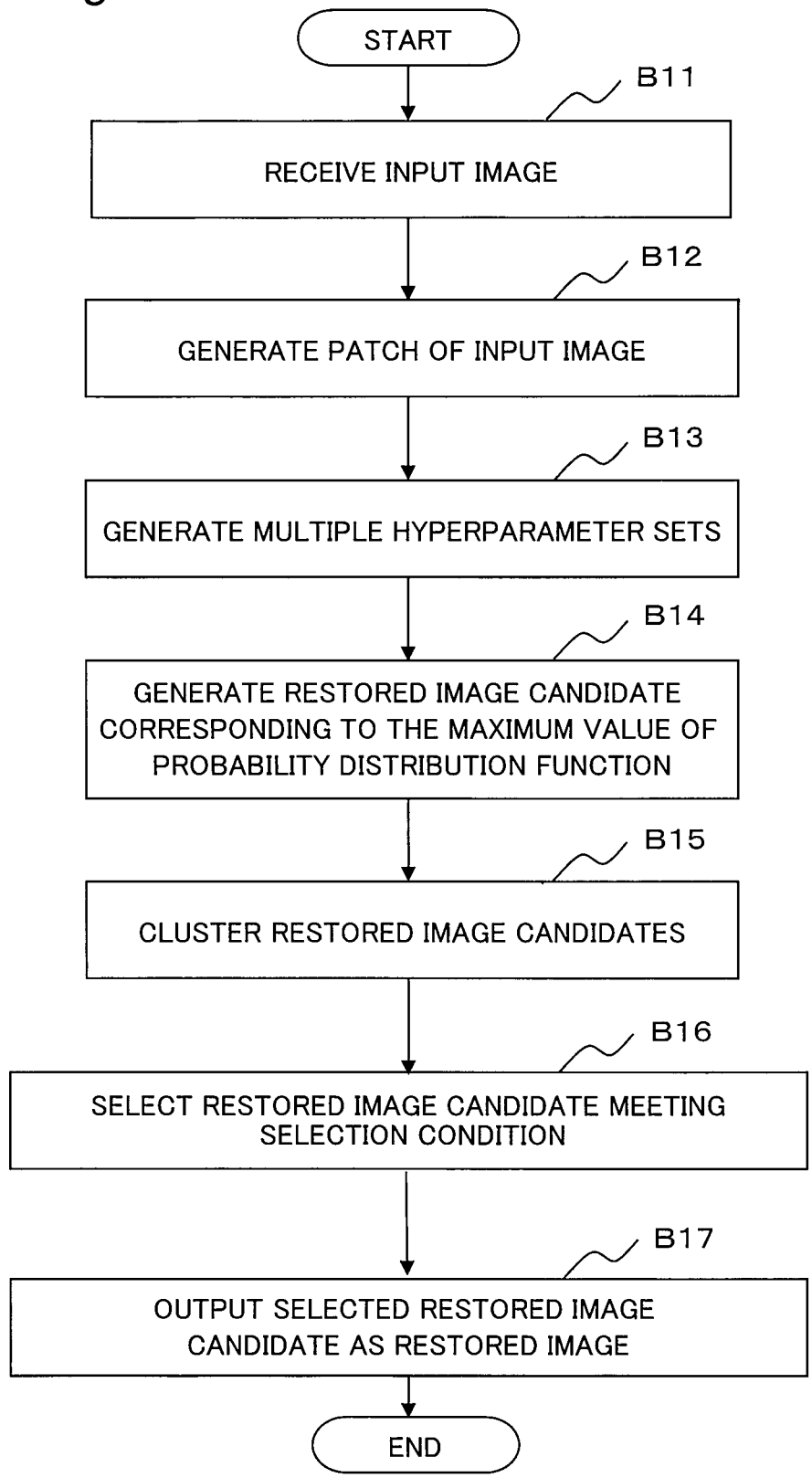
FIG. 15 is a flowchart illustrating operation of the restoring device according to the first exemplary embodiment.
Figure 16:
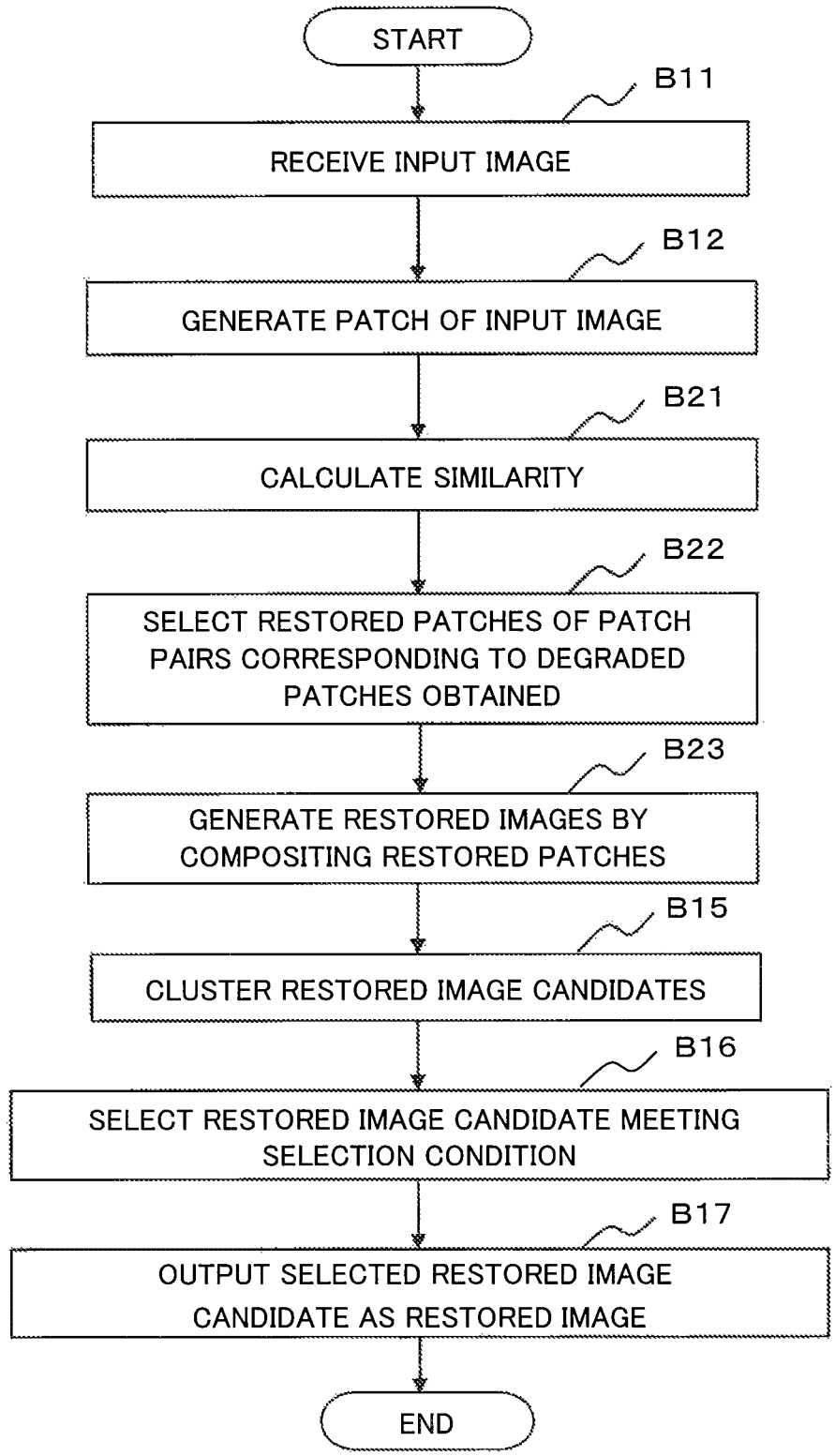
FIG. 16 is a flowchart illustrating operation of the restoring device according to the first exemplary embodiment.

FIGS. 15 and 16 are flowcharts illustrating operation of the restoring device 301. The operation of the restoring device 301 as shown in FIG. 15 is an operation where the restored image candidate generation unit 541 generates restored image candidates in accordance with the first method.

The reception unit 310 receives the input image, which is the target of the image processing, from the outside (step B11).

Subsequently, the patch generation unit 521 divides the input image, which is output from the reception unit 310, into blocks, and generates multiple patches (input patches 31) (step B12). For example, the patch generation unit 521 may adopt a region made up with totally 25 pixels arranged in 5 pixels by 5 pixels as a patch unit of the input patch 31. In this case, the patch generation unit 521 may generate the input patch 31 in such a relationship that an adjacent patch is deviated by one pixel with respect to the input image. It is to be noted that the number of pixels of a region of a patch and the relationship with an adjacent patch are not limited thereto. For example, the patch generation unit 521 may generate the input patch 3 as a patch in such a relationship that an adjacent patch is deviated by three pixels. When the number of deviation pixels of the input patch 31 and a patch adjacent thereto is smaller (when the overlapping with the adjacent patch is greater), more detailed composition processing can be performed to generate a restored image.

Subsequently, the hyperparameter set generation unit 531 generates multiple hyperparameters (step B13).

Subsequently, the restored image candidate generation unit 541 generates, as the restored image candidate, the super resolution image of which probability distribution function derived from the equation 1 yields the maximum value for each of these hyperparameters (step B14). Alternatively, the restored image candidate generation unit 541 may generate, as the restored image candidate, the super resolution image of which energy E derived from the equation 2 is the minimum value for each of these hyperparameters.

Subsequently, the image selection presenting unit 511 clusters these restored image candidates (step B15).

Subsequently, the image selection presenting unit 511 uses the result of the clustering to select the restored image candidate in conformity with the selection condition determined in advance (step B16).

Subsequently, the image selection presenting unit 511 outputs the selected restored image candidate as the restored image (step B17).

The operation of the restoring device 301 as shown in FIG. 16 is an operation where the restored image candidate generation unit 541 generates restored image candidates in accordance with the second method. The operation of the restoring device 301 as shown in FIG. 16 is an operation in which step B13 and step B14 of the flowchart as shown in FIG. 15 are replaced with step B21 to step B23 shown below.

The restored image candidate generation unit 541 calculates the similarity degree of all of the degraded patches 202 included in the dictionary 200 for each of the input patches 31 generated by the patch generation unit 521 (step B21).

Subsequently, the restored image candidate generation unit 541 obtains multiple degraded patches 202 on the basis of the calculated similarity degree from the data of the patch pairs 203 stored in the dictionary 200. Subsequently, the restored image candidate generation unit 541 selects the restored patches 201 of the patch pairs 203 respectively corresponding to the patch identifiers 53, and outputs the restored patches 201 (step B22). In this case, the patch identifier 53 is a patch identifier 53 of the degraded patch 202 obtained.

Likewise, the restored image candidate generation unit 541 executes step B22 for each of all the input patches 31, and selects the restored patch 201.

Subsequently, the restored image candidate generation unit 541 generates multiple restored images by compositing the restored patches 201 respectively corresponding to all of the input patches 31 by changing the combination (step B23). It is to be noted that the processing for 'compositing an image (a patch)' may also be, more specifically, processing for 'deriving an average of pixel values of all the images (patches) which are to be composited'. In this case, 'deriving an average' means calculating an average value for each pixel value at the same position between the patches.

More specifically, 'composition' may be processing for deriving an average of pixel values of all the overlapping restored patches 201 in the overlapping region when all the restored patches 201 are placed at corresponding positions.

The operation of the restoring device 301 has been hereinabove explained.

The first advantage of the present exemplary embodiment explained above is the ability to improve the probability of outputting a restored image accurately corresponding to the original image included in the input image.

This is because the present exemplary embodiment includes the following configuration. Firstly, the restored image candidate generation unit 541 generates multiple restored image candidates including multiple different contents that may be the original content of the input image from the single input image thereof. Secondly, the image selection presenting unit 511 outputs the restored image on the basis of the result obtained by clustering the restored image candidates.

Second Exemplary Embodiment

Subsequently, the second exemplary embodiment of the present invention will be explained in details with reference to drawings. In the explanation below, the same contents as the above explanation will not be repeatedly explained as long as the explanation about the present exemplary embodiment does not become unclear.

Figure 17:
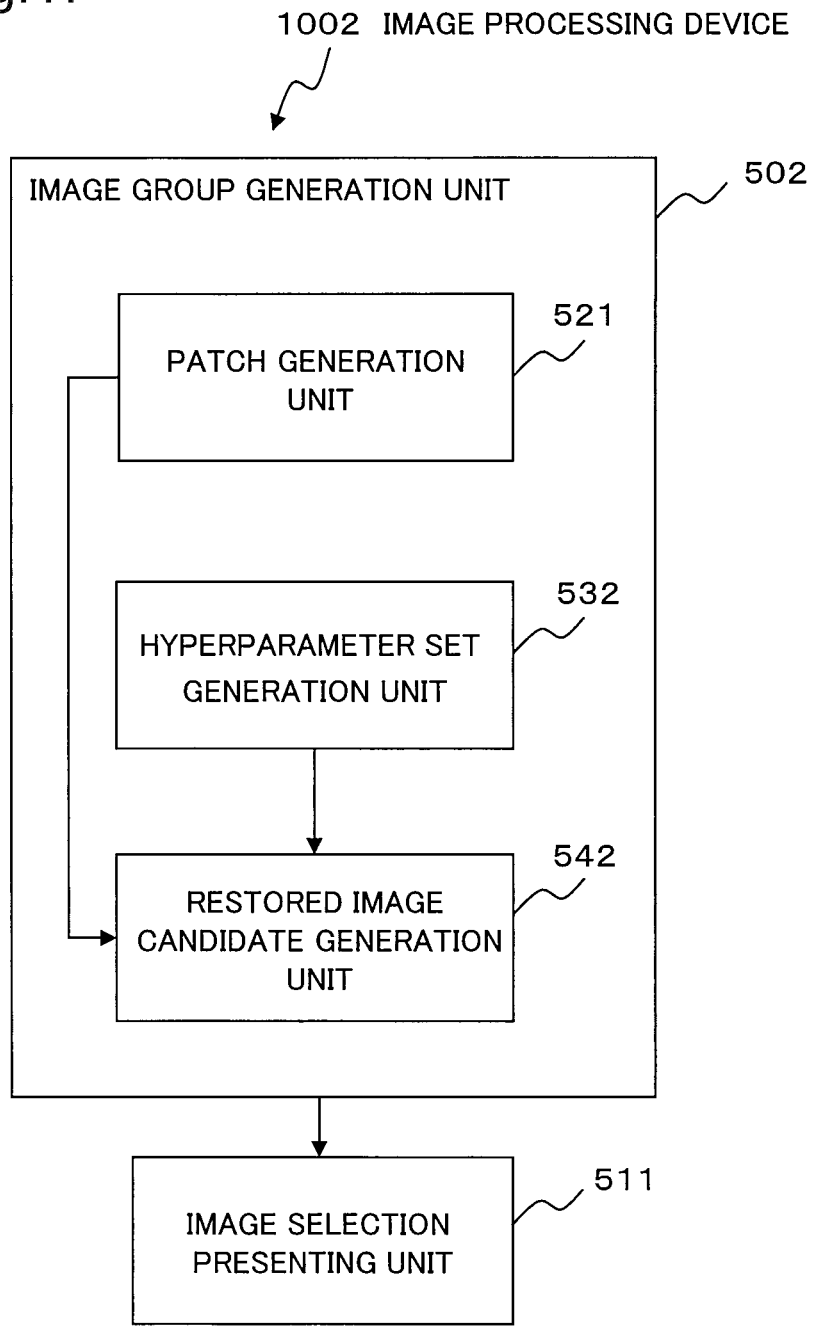
FIG. 17 is a block diagram illustrating a configuration of an image processing device according to a second exemplary embodiment of the present invention.

FIG. 17 is a block diagram illustrating a configuration of an image processing device 1002 according to the second exemplary embodiment of the present invention. Instead of the image processing device 1001, the image processing device 1002 as shown in FIG. 17 is included in the restoring device 301 as shown in FIG. 6, for example.

As shown in FIG. 17, the image processing device 1002 according to the present exemplary embodiment includes an image group generation unit 502 and an image selection presenting unit 511.

The image group generation unit 502 includes a patch generation unit 521, a hyperparameter set generation unit 532, and a restored image candidate generation unit 542.

The restoring device 301 as shown in FIG. 6 may include the image processing device 1002 instead of the image processing device 1001.

===Hyperparameter Set Generation Unit 532===

The hyperparameter set generation unit 532 generates a single hyperparameter set 60.

For example, the hyperparameter set generation unit 531 generates the hyperparameter set 60 on the basis of a command given by an interface, not shown. The hyperparameter set generation unit 531 may generate the hyperparameter set 60 on the basis of an operator's command which is input from means, not shown.

===Restored Image Candidate Generation Unit 542===

The restored image candidate generation unit 542 generates the restored image candidates corresponding to multiple local maximum values of the probability distribution function corresponding to the hyperparameter set 60. More specifically, the restored image candidate generation unit 542 is different from the restored image candidate generation unit 541 as shown in FIG. 7 in the following features. The restored image candidate generation unit 541 derives the maximum value of the probability distribution function, and generates the super resolution image corresponding to the maximum value as the restored image candidate. In contrast, the restored image candidate generation unit 542 derives multiple local maximum values of the probability distribution function, and generates the super resolution images corresponding to the local maximum values as the restored image candidates.

Figure 18:
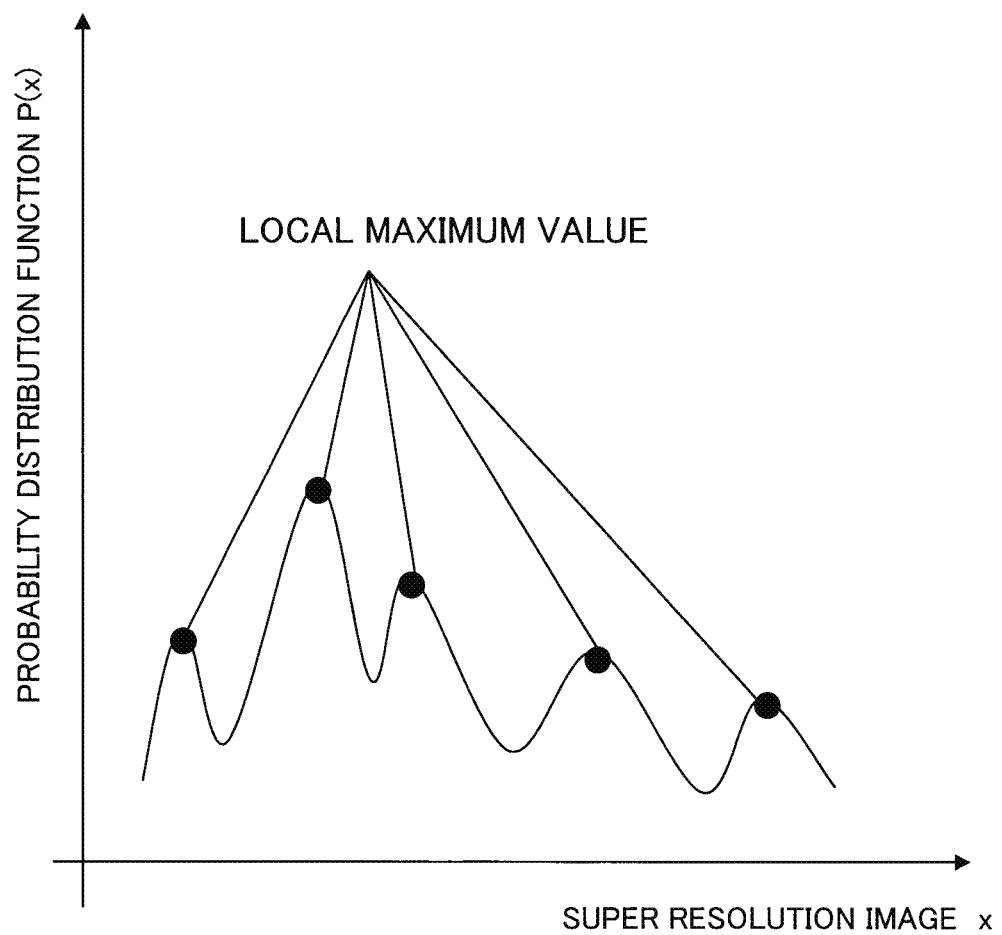
FIG. 18 is a drawing schematically illustrating a probability distribution function and an image of a local maximum value thereof.

FIG. 18 is a drawing schematically illustrating the probability distribution function expressed by the equation 1 and an image of a local maximum value thereof.

Like the hyperparameter set generation unit 531, the hyperparameter set generation unit 532 may generate multiple hyperparameter sets 60.

In this case, the restored image candidate generation unit 542 may generate restored image candidates corresponding to multiple local maximum values for each of the probability distribution functions respectively corresponding to the hyperparameter sets 60.

Subsequently, operation of the present exemplary embodiment will be explained in details with reference to drawings.

Figure 19:
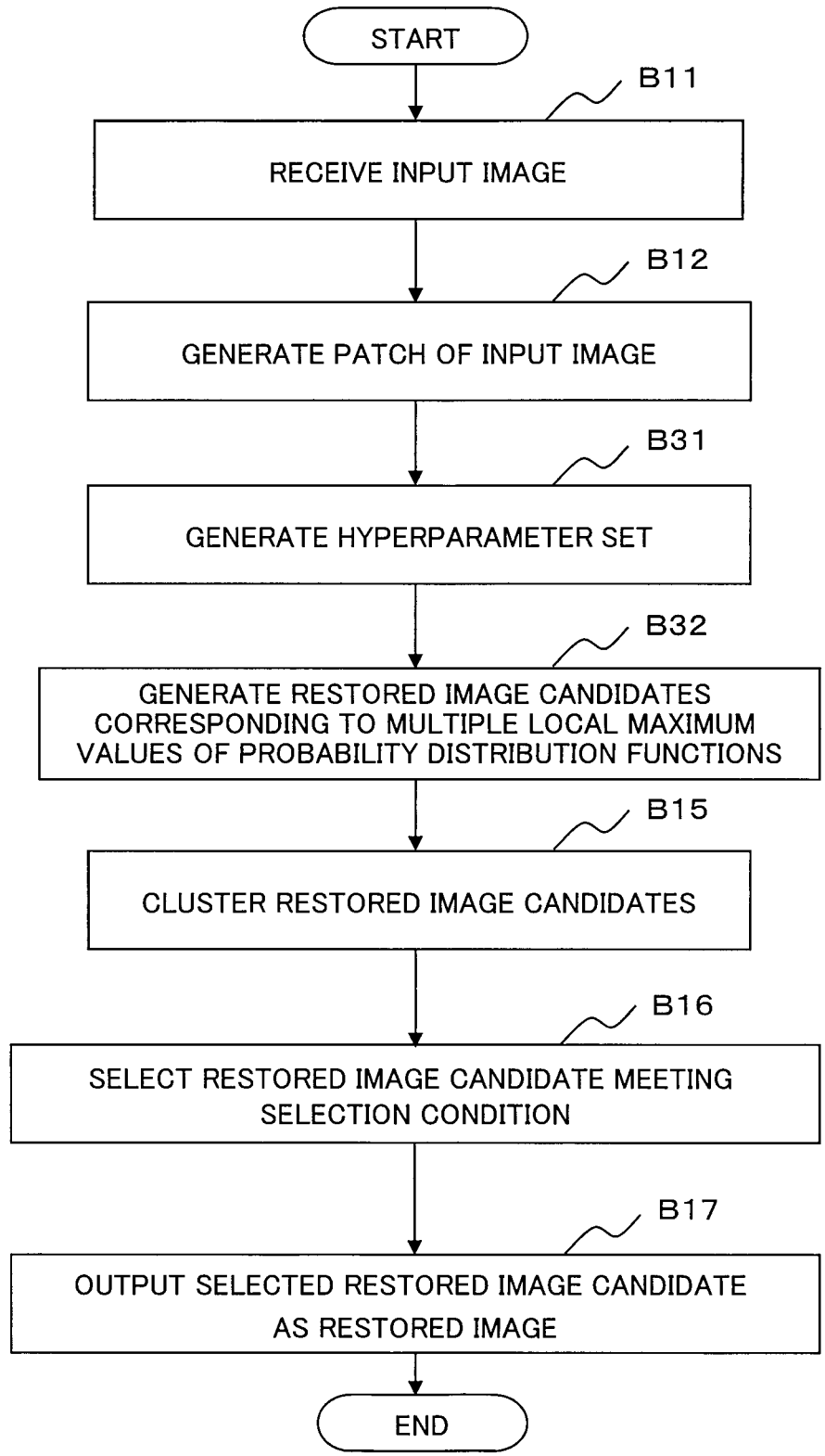
FIG. 19 is a flowchart illustrating operation of a restoring device according to the second exemplary embodiment.

FIG. 19 is a flowchart illustrating operation of the restoring device 301 including the image processing device 1002 according to the present exemplary embodiment. The operation of the image processing device 1002 of the restoring device 301 as shown in FIG. 19 is an operation in which step B13 and step B14 of the flowchart as shown in FIG. 15 are replaced with step B31 to step B32 shown below.

The hyperparameter set generation unit 532 generates a single or multiple hyperparameter sets 60 (step B31).

The restored image candidate generation unit 542 generates restored image candidates corresponding to multiple local maximum values of the probability distribution function for each or multiple hyperparameter sets 60 (step B32).

Like the first exemplary embodiment, the first advantage according to the present exemplary embodiment explained above is the ability to improve the probability of outputting a restored image accurately corresponding to the original image included in the input image.

This is because the restored image candidate generation unit 542 is configured to generate restored image candidates corresponding to multiple local maximum values of the probability distribution function.

The second advantage according to the present exemplary embodiment explained above is the ability to further improve the probability of outputting a restored image accurately corresponding to the original image included in the input image.

This is because the restored image candidate generation unit 541 is configured to generate restored image candidates respectively corresponding to multiple hyperparameter sets 60 on the basis of the probability distribution function and corresponding to multiple local maximum values of the probability distribution function thereof.

Third Exemplary Embodiment

Subsequently, the third exemplary embodiment of the present invention will be explained in details with reference to drawings. In the explanation below, the same contents as the above explanation will not be repeatedly explained as long as the explanation about the present exemplary embodiment does not become unclear.

Figure 20:
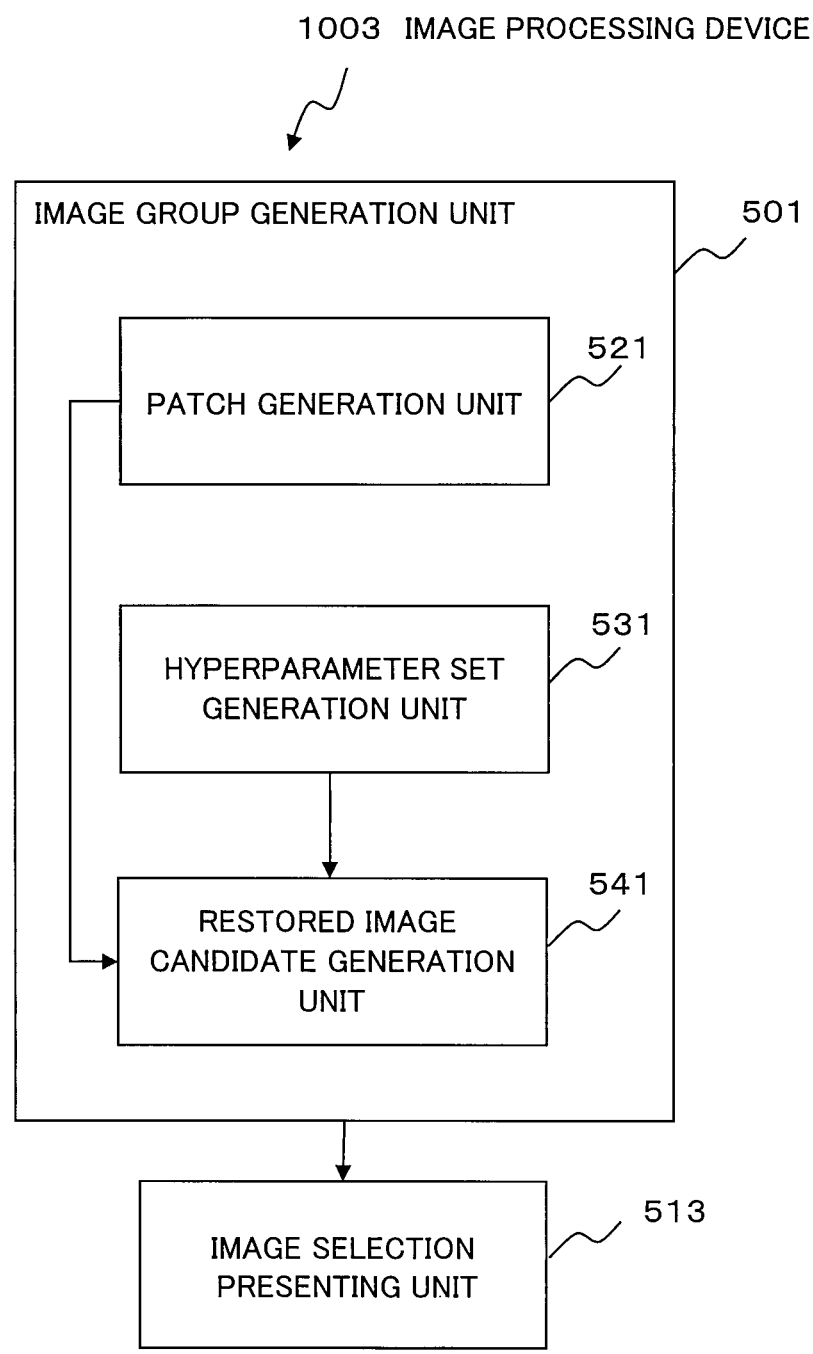
FIG. 20 is a block diagram illustrating a configuration of a processing device according to a third exemplary embodiment image of the present invention.

FIG. 20 is a block diagram illustrating a configuration of an image processing device 1003 according to the third exemplary embodiment of the present invention.

As shown in FIG. 20, the image processing device 1003 according to the present exemplary embodiment includes an image group generation unit 501 and an image selection presenting unit 513. It is to be noted that the image processing device 1003 may include the image group generation unit 502 instead of the image group generation unit 501. Instead of the image processing device 1001, the image processing device 1003 as shown in FIG. 20 is included in the restoring device 301 as shown in FIG. 6, for example.

===Image Selection Presenting Unit 513===

The image selection presenting unit 513 generates divided restored image candidates made by dividing each of the multiple restored image candidates into multiple portions. Subsequently, the image selection presenting unit 513 clusters each of the group constituted by divided restored image candidates of a particular region. In this case, divided restored image candidates of a particular region are divided restored image candidates corresponding to the same position of each of the restored image candidates. Subsequently, the image selection presenting unit 513 selects divided restored image candidates for each group, on the basis of the clustered result. Subsequently, the image selection presenting unit 513 composites the selected divided restored image candidates and generates a super resolution image, and outputs the super resolution image as a restored image candidate.

The image selection presenting unit 513 selects divided restored image candidates in conformity with the selection condition determined in advance. Then, the image selection presenting unit 513 composites the selected restored image candidates on the basis of the composition condition determined in advance. For example, the selection condition and the composition condition may be given from the outside via an interface, not shown. The selection condition and the composition condition may be give may be given with input means, not shown, by an operator.

The image selection presenting unit 513 randomly selects as many divided restored image candidates of the centroids of the classes as the designated amount n (where n is a natural number equal to or more than one) for, e.g., each group (more specifically each region) on the basis of the selection condition and the composition condition. Then, the image selection presenting unit 513 performs composition by changing the combination of the selected divided restored image candidates.

The image selection presenting unit 513 selects as many divided restored image candidates of the centroids of the classes of which number of elements is equal to or more than the threshold value for each group on the basis of the selection condition and the composition condition. Then, the image selection presenting unit 513 performs composition by changing the combination of the selected divided restored image candidates.

The image selection presenting unit 513 selects as many divided restored image candidates of centroids of classes as the designated amount n in the descending order of the number of elements in the classes for each group on the basis of the selection condition and the composition condition. Then the image selection presenting unit 513 performs composition by changing the combination of the selected divided restored image candidates.

The image selection presenting unit 513 selects divided restored image candidates of centroids of all the classes as many as the designated number n for each group on the basis of the selection condition and the composition condition. Then, the image selection presenting unit 513 performs composition by changing the combination of the selected divided restored image candidates.

Subsequently, operation of the restoring device 301 including the image processing device 1000 will be hereinafter explained in details with reference to drawings.

Figure 21:
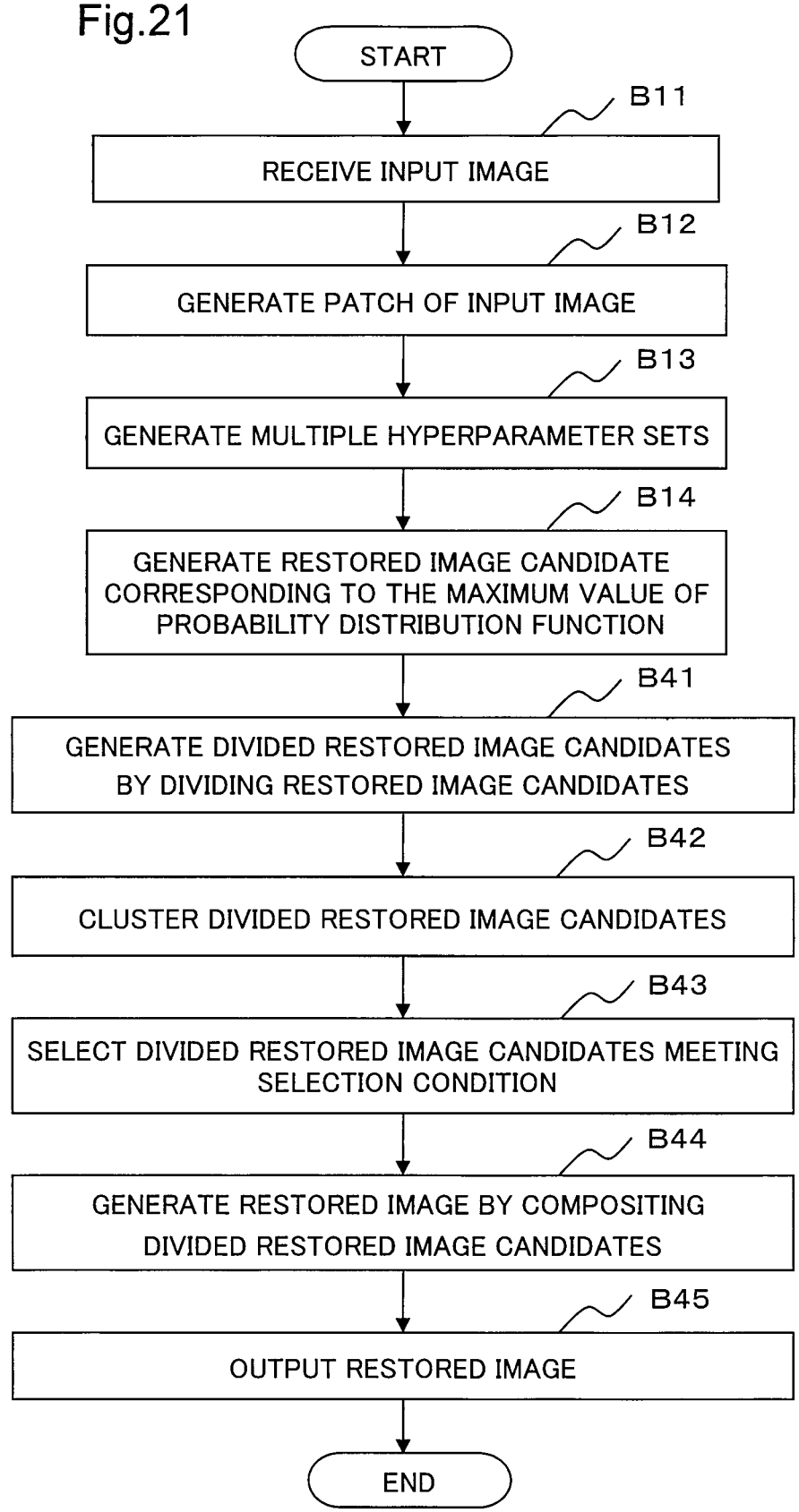
FIG. 21 is a flowchart illustrating operation of a restoring device according to the third exemplary embodiment.

FIG. 21 is a flowchart illustrating operation of the restoring device 301 including the image processing device 1003. The operation of the restoring device 301 including the image processing device 1003 is an operation in which step B15 and step B17 of the flowchart as shown in FIG. 15 are replaced with step B41 to step B45 shown below.

The image selection presenting unit 513 divides the restored image candidates, and generates divided restored image candidates (step B41).

Subsequently, the image selection presenting unit 513 clusters the divided restored image candidates for each group (step B42).

Subsequently, the image selection presenting unit 513 uses the result of the clustering to select divided restored image candidates in conformity with a selection condition determined in advance (step B43).

Subsequently, the image selection presenting unit 513 generates a restored image by compositing the selected divided restored image candidates (step B44).

Subsequently, the image selection presenting unit 513 outputs the generated restored image (step B45).

The advantages of the present exemplary embodiment explained above are not only the advantages of the first exemplary embodiment but also capable of improving the probability of outputting the desired restored image even if the degradation of the input image is not uniform. The desired restored image is the restored image accurately corresponding to the original image included in the input image.

This is because the image selection presenting unit 513 is configured to perform processing on the divided restored image candidates obtained by dividing each of multiple restored image candidates into multiple portions.

Fourth Exemplary Embodiment

Subsequently, the fourth exemplary embodiment of the present invention will be explained in details with reference to drawings. In the explanation below, the same contents as the above explanation will not be repeatedly explained as long as the explanation about the present exemplary embodiment does not become unclear.

Figure 22:
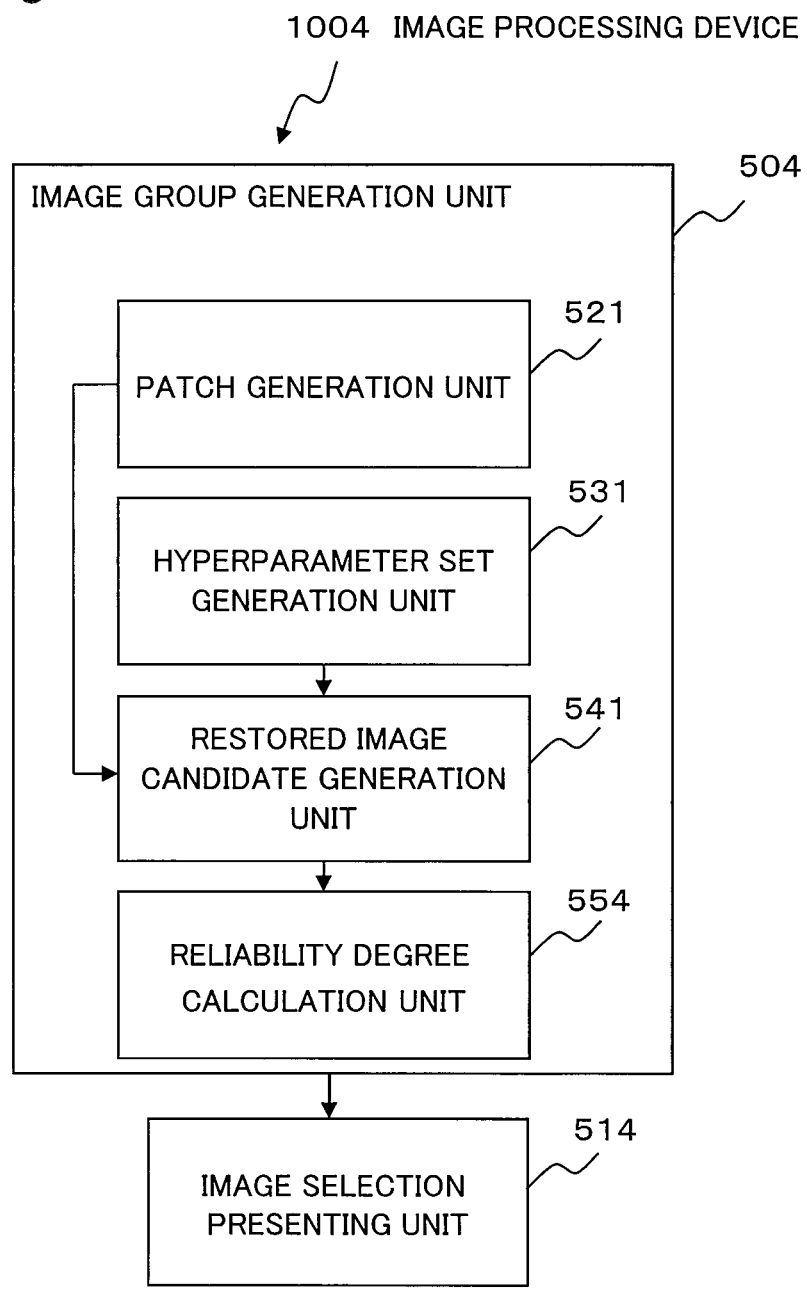
FIG. 22 is a block diagram illustrating a configuration of an image processing device according to a fourth exemplary embodiment of the present invention.

FIG. 22 is a block diagram illustrating a configuration of an image processing device 1004 according to the fourth exemplary embodiment of the present invention.

As shown in FIG. 22, the image processing device 1004 according to the present exemplary embodiment includes an image group generation unit 504 and an image selection presenting unit 514. An image group generation unit 504 of the image processing device 1004 includes a patch generation unit 521, a hyperparameter set generation unit 531, a restored image candidate generation unit 541, and the reliability degree calculation unit 554. It is to be noted that the image group generation unit 504 may include the hyperparameter set generation unit 532 instead of the hyperparameter set generation unit 531. The image group generation unit 504 may include the restored image candidate generation unit 542 instead of the restored image candidate generation unit 541. Instead of the image processing device 1001, the image processing device 1004 as shown in FIG. 22 is included in the restoring device 301 as shown in FIG. 6, for example.

===Reliability Degrees Calculation Unit 554===

The reliability degree calculation unit 554 calculates the degrees of reliability of each of the restored image candidates generated by the restored image candidate generation unit 541. The details of the calculation of the degrees of reliability will be explained later.

===Image Selection Presenting Unit 514===

The image selection presenting unit 514 selects the restored image candidate on the basis of the degrees of reliability thus calculated, and outputs the selected restored image candidate as the restored image.

More specifically, like the image selection presenting unit 511, the image selection presenting unit 514 uses the result of the clustering to select a restored image candidate in conformity with a selection condition determined in advance. In the present exemplary embodiment, the selection condition includes a condition of reliability degrees. For example, the selection condition includes a condition that the degree of reliability is the highest and a condition that the degree of reliability is equal to or more than a predetermined threshold value.

It is to be noted that the image selection presenting unit 514 may generate divided restored image candidates obtained by dividing each of the multiple restored image candidates into multiple portions, and output the divided restored image candidates to the reliability degree calculation unit 554. In this case, the reliability degree calculation unit 554 may calculate the degrees of reliability of the divided restored image candidates. The image selection presenting unit 514 may cluster each of the group constituted by the portion restored image candidates of a particular region corresponding to the same position. The image selection presenting unit 514 may select divided restored image candidates for each group on the basis of the result of the clustering, and may composite and output the selected divided restored image candidate.

Subsequently, operation of the restoring device 301 including the image processing device 1004 will be explained in details with reference to drawings.

Figure 23:
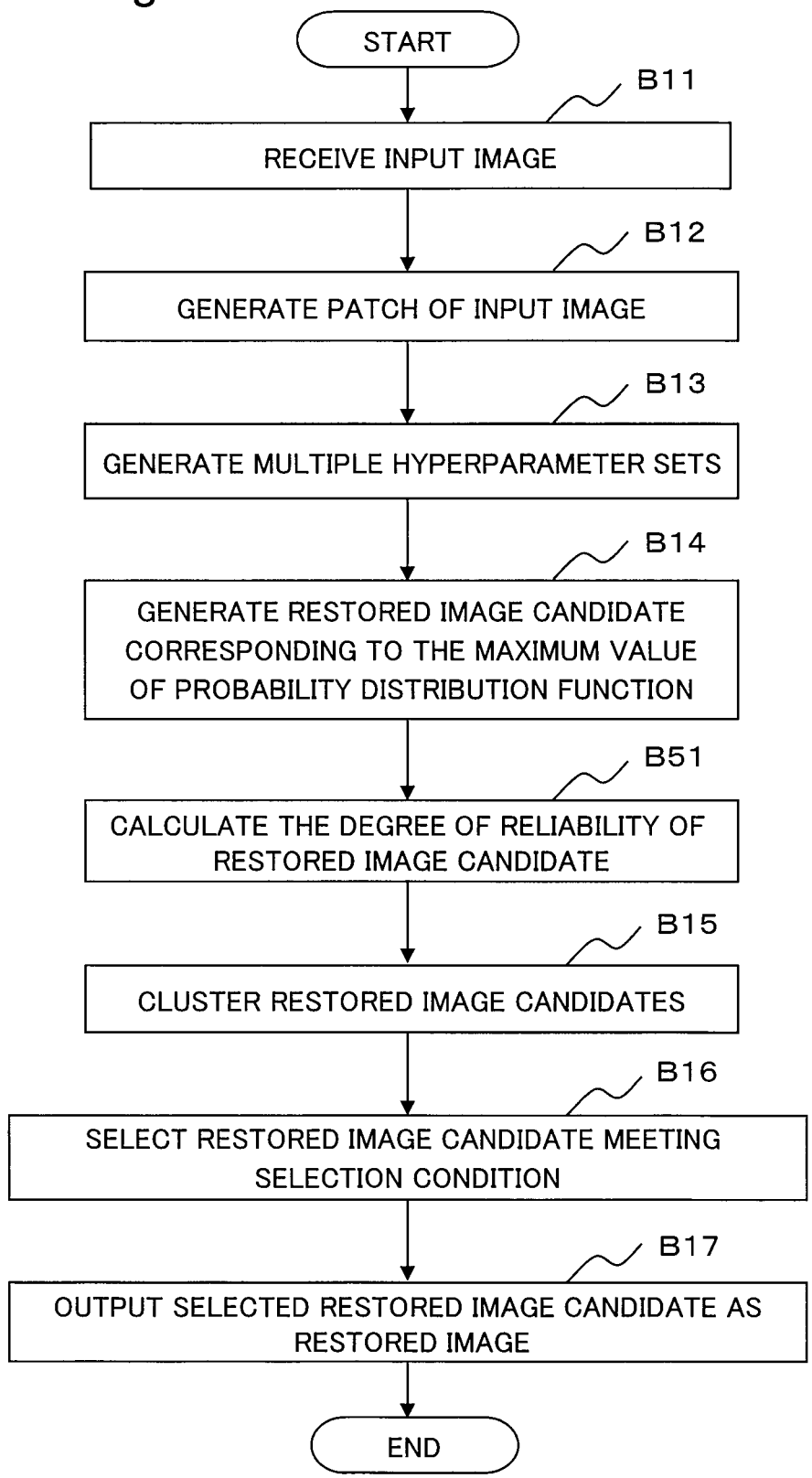
FIG. 23 is a flowchart illustrating operation of a restoring device according to the fourth exemplary embodiment.

FIG. 23 is a flowchart illustrating operation of the restoring device 301 including the image processing device 1003. The operation of the restoring device 301 including the image processing device 1003 is an operation of the flowchart as shown in FIG. 15 additionally including step B51 explained below.

The reliability degree calculation unit 554 calculates the degree of reliability of each restored image candidate (step B51).

Subsequently, the first to fourth the reliability degree calculation schemes will be explained as detailed examples of the reliability degree calculation.

In the first reliability degree calculation scheme, the reliability degree calculation unit 554 generates a reduced-quality image from a restored image candidate. Then, the reliability degree calculation unit 554 calculates the degrees of reliability on the basis of the difference between the reduced-quality image and the input image.

In the second reliability degree calculation scheme, the reliability degree calculation unit 554 calculates the degrees of reliability on the basis of the difference between adjacent restored patches 201 in a case where a restored image candidate is generated.

In the third reliability degree calculation scheme, the reliability degree calculation unit 554 calculates the degrees of reliability on the basis of the degree of risk which is a ratio of the similarity degree between the degraded patches 202 and the similarity degree between the restored patches 201 corresponding to the degraded patches 202.

The degree of risk is a ratio of the similarity degree between the degraded patches 202 and the similarity degree between the restored patches 201 corresponding to the degraded patches 202. When the similarity degree between the restored patches 201 corresponding to the degraded patches 202 is relatively smaller than the magnitude of the similarity degree of the degraded patches 202, the value of the degree of risk increases. More specifically, when the degraded patches 202 are similar but the restored patches 201 corresponding to the degraded patches 202 are not similar.

For example, the reliability degree calculation unit 554 uses the following equation 5, equation 6, and equation 7 to calculate the degree of risk K.

The equation 5 is an equation for calculating an average value $D_{LR}$ of distances between the selected degraded patch 202 and K neighborhood. degraded patches 202. The K neighborhood. degraded patch 202 is K degraded patches 202 (for example, 7 degraded patches 202) (a set R in the equation 5) in the ascending order of the distance from the selected degraded patch 202. The denominator at the right hand side of the equation 5 is a product of the number (which is K) of K neighborhood. degraded patches 202 of the selected degraded patch 202 and the number of pixels $S_L$ of the degraded patch 202. The numerator at the right hand side of the equation 5 is a total summation of squares of L2 norms of the selected degraded patch 202 and each of the K neighborhood. degraded patches 202.

$$D_{LR} = \frac{\sum_{i \in R} \|x_i - x_k\|_2^2}{K \cdot S_L} \quad \text{(Equation 5)}$$

The equation 6 is an equation for calculating an average value $D_{HR}$ of distances between the selected restored patch 201 and the K neighborhood. degraded patches 202. The K neighborhood. restored patches 201 is K restored patches 201 (for example, 7 restored patches 201) (a set R in the equation 6) in the ascending order of the distance from the selected restored patch 201. The denominator at the right hand side of the equation 6 is a product of the number (which is K) of K neighborhood. restored patches 201 of the selected degraded patch 202 and the number of pixels $S_H$ of the restored patch 201. The numerator at the right hand side of the equation 6 is a total summation of squares of L2 norms of the selected restored patch 201 and each of the K neighborhood restored patches 201.

$$D_{HR} = \frac{\sum_{i \in R} \|X_i - X_k\|_2^2}{K \cdot S_H} \quad \text{(Equation 6)}$$

The equation 7 is an equation for calculating the degree of risk K. α denotes a constant for adjusting the range of K when $D_{LR}$ is small.

$$K = \frac{D_{HR}}{D_{LR} + \alpha} \quad \text{(Equation 7)}$$

In the fourth reliability degree calculation scheme, the reliability degree calculation unit 554 calculates the degrees of reliability on the basis of statistical deviation of multiple restored image candidates.

The reliability degree calculation unit 554 generates a feature vector of which element is each value of a gradient direction histogram of a restored image candidate. The scheme for making the direction histogram is a well-known technique, and is described in, for example, "D. G. Lowe, "Object recognition from local scale-invariant features", Proc. of IEEE International Conference on Computer Vision (ICCV), pp. 1150-1157, 1999." and "N. Dalal, B. Triggs, "Histograms of oriented gradients for human detection", Proc. of IEEE Conference on Computer Vision and Pattern Recognition (CVPR), pp. 886-893, 2005.".

Subsequently, the reliability degree calculation unit 554 maps these feature vectors to a feature space, and calculates L2 norms as distance spaces.

Subsequently, the reliability degree calculation unit 554 uses the calculated L2 norms as samples to calculate the density estimation values corresponding to the feature vectors by Kernel density estimation based on Parzen window. Subsequently, the reliability degree calculation unit 554 adopts the calculated density estimation value as the degrees of reliability of the restored image candidate corresponding to the feature vector.

It is to be noted that the reliability degree calculation unit 554 may calculate the degrees of reliability on the basis of the statistical deviation for each class of the restored image candidates clustered by the image selection presenting unit 514. In this case, the image selection presenting unit 514 may select a restored image candidate for each class, on the basis of the degrees of reliability calculated for the class.

The detailed example of the reliability degree calculation has been hereinabove explained.

The advantages of the present exemplary embodiment explained above are not only the advantages of the first exemplary embodiment but also capable of further improving the probability of outputting the restored image accurately corresponding to the original image included in the input image.

This is because the reliability degree calculation unit 554 is configured to calculate the degrees of reliability of the restored image candidates, and the image selection presenting unit 514 is configured to output the restored image on the basis of the degrees of reliability.

Fifth Exemplary Embodiment

Subsequently, the fifth exemplary embodiment of the present invention will be explained in details with reference to drawings. In the explanation below, the same contents as the above explanation will not be repeatedly explained as long as the explanation about the present exemplary embodiment does not become unclear.

Figure 24:
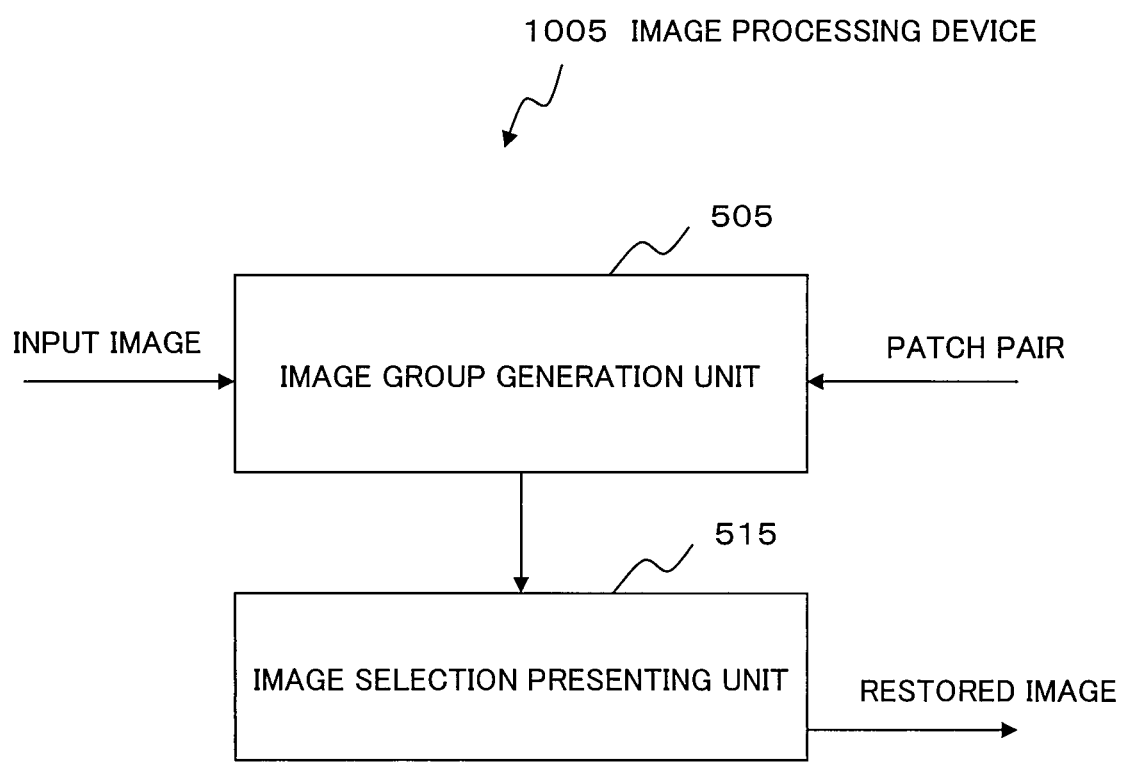
FIG. 24 is a block diagram illustrating a configuration of an image processing device according to a fifth exemplary embodiment of the present invention.

FIG. 24 is a block diagram illustrating a configuration of an image processing device 1005 according to the fifth exemplary embodiment.

As shown in FIG. 24, the image processing device 1005 according to the present exemplary embodiment includes an image group generation unit 505 and an image selection presenting unit 515.

===Image Group Generation Unit 505===

For example, the image group generation unit 505 uses the dictionary 200 as shown in FIG. 1, and generates multiple restored image candidates including multiple different contents that may be the original content of the input image from the single input image. In this case, as explained in the first exemplary embodiment, the dictionary 200 stores multiple patch pairs 203 in which a degraded patch 202 which is a patch of a degraded image obtained by degrading a predetermined image and a restored patch 201 which is a patch of the predetermined image are associated with each other. In this case, for example, the predetermined image is the learning image 10 as shown in FIG. 3. The degraded image is the degraded image 20 as shown in FIG. 3.

===Image Selection Presenting Unit 515===

The image selection presenting unit 515 clusters multiple restored image candidates generated by the image group generation unit 505. Subsequently, the image selection presenting unit 515 selects restored image candidates on the basis of the result of the clustering. Subsequently, the image selection presenting unit 515 outputs the selected restored image candidates.

The image selection presenting unit 515 may select the restored image candidates in conformity with the selection condition determined in advance. For example, the selection condition may be given from the outside via an interface, not shown. The selection condition may be given with input means, not shown, by an operator. For example, the image selection presenting unit 515 selects and outputs multiple restored image candidates. The image selection presenting unit 515 may select and output a single restored image candidate.

As described above, the image processing device 1005 outputs multiple restored images corresponding to a single input image.

Subsequently, the hardware unit and the constituent elements of the image processing device 1005 will be explained.

Figure 25:
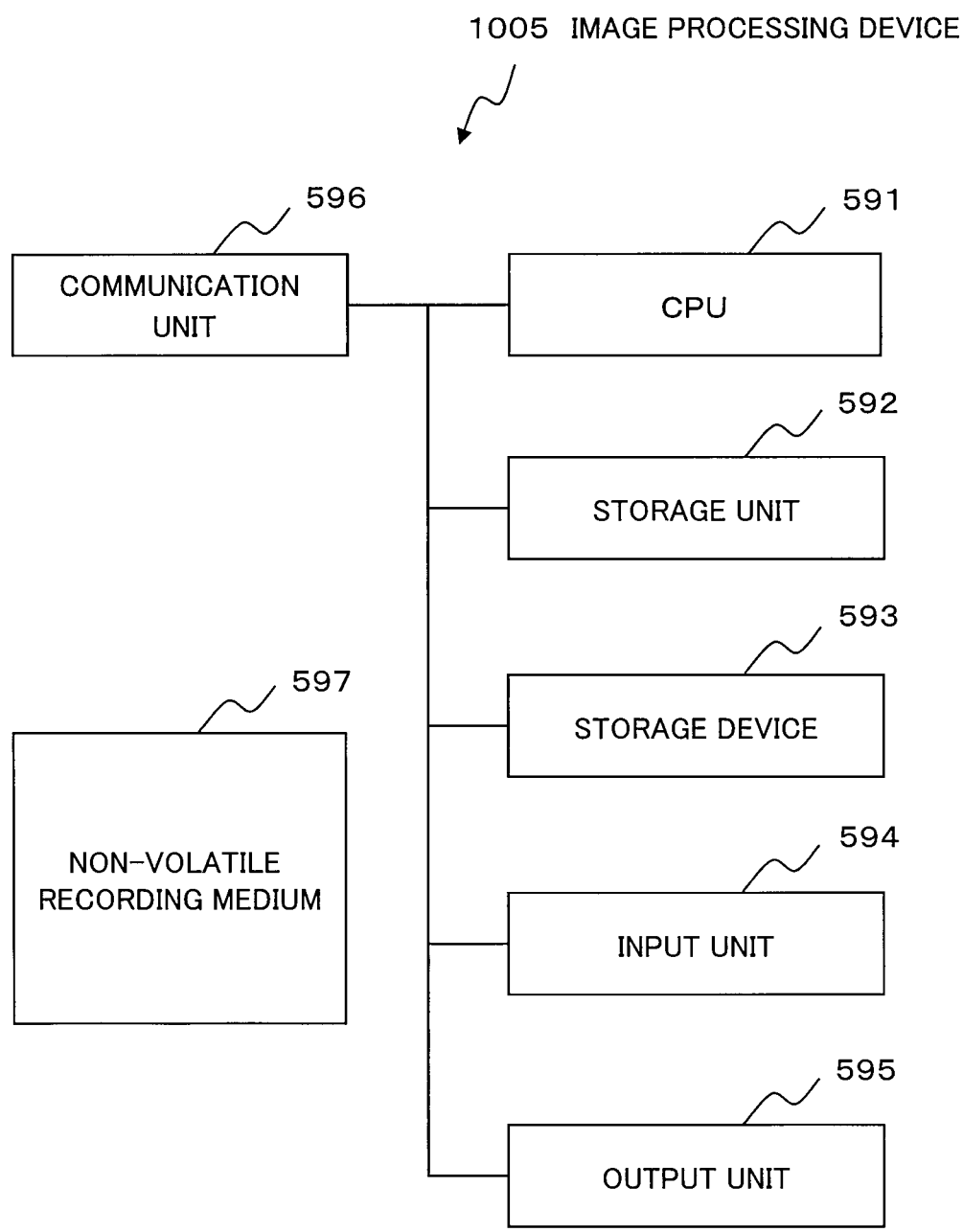
FIG. 25 is a drawing illustrating a hardware configuration of a computer device achieving the image processing device according to the fifth exemplary embodiment of the present invention.

FIG. 25 is a drawing illustrating hardware configuration of a computer device achieving the image processing device 1005 according to the present exemplary embodiment. As shown in FIG. 25, the image processing device 1005 includes a CPU (Central Processing Unit) 591, a storage unit 592, a storage device 593, an input unit 594, an output unit 595, and a communication unit 596. The image processing device 1005 further includes a recording medium 597.

The CPU 591 operates an operating system (not shown) to control the entire operation of the image processing device 1005. For example, the CPU 591 reads a program and data from a non-volatile recording medium 597 loaded to the storage device 593, and writes the program and data having been read to the storage unit 592. The program is, for example, a program causing a computer to execute operation of a flowchart shown in FIG. 15, FIG. 16, FIG. 19, FIG. 21, and FIG. 23. Then, the CPU 591 executes various kinds of processing to serve as the image group generation unit 505 and the image selection presenting unit 515 as shown in FIG. 24 in accordance with the read program and on the basis of the read data.

It is to be noted that the CPU 591 may be configured to download the program and the data to the storage unit 592 from an external computer (not shown) connected to a communication network (not shown).

The storage unit 592 stores the program and the data. The storage unit 592 may include the dictionary 200.

The storage device 593 is, for example, an optical disk, a flexible disk, a magneto-optical disk, an external hard disk, and a semiconductor memory, and includes a non-volatile storage medium. The storage device 593 records the program in a computer-readable manner. The storage device 593 may record data in a computer-readable manner. The storage device 593 may include the dictionary 200.

The input unit 594 is achieved with, for example, a mouse, a keyboard, internal key buttons, and the like, and is used for input operation. The input unit 594 is not limited to a mouse, a keyboard, internal key buttons, and the like, and may be, for example, a touch panel, a camera, and the like. The input unit 594 may be means for inputting an input image, a selection condition, and a composition condition.

The output unit 595 is achieved with, for example, a display, and is used for confirming the output. The output unit 595 may be means for outputting a restored image.

The communication unit 596 achieves an interface between a network and the image processing device 1005. The image processing device 1005 may also be connected to the dictionary 200 via, for example, the communication unit 596. The communication unit 596 may be configured to receive an input image, a selection condition from an external system, not shown. The communication unit 596 may be configured to transmit a restored image to an external system, not shown.

Each constituent element of the hardware unit of the image processing device 1005 has been hereinabove explained.

As explained above, the blocks of the functional units as shown in FIG. 24 are achieved by the hardware configuration as shown in FIG. 25. However, means for achieving each unit provided in the image processing device 1005 is not limited to the above. More specifically, the image processing device 1005 may be achieved by a single device physically combined, or may be achieved by multiple devices made by connecting two or more physically separated devices via a wire or wirelessly.

The recording medium 597 may be a non-volatile recording medium. The recording medium 597 recorded with the program may be provided to the image processing device 1005, and the image processing device 1005 may read and execute the program stored in the recording medium 597. More specifically, the exemplary embodiment of the present invention includes an exemplary embodiment of a recording medium that stores the program executed by the image processing device 1005 in a transitory or a non-transitory manner.

The first advantage of the present exemplary embodiment explained above is the ability to improve the probability of outputting a restored image accurately corresponding to the original image included in the input image.

This is because the image group generation unit 505 generates multiple restored image candidates from a single input image, and the image selection presenting unit 515 clusters the restored image candidates, and outputs the restored image on the basis of the result.

The second advantage of the present exemplary embodiment explained above lies in that the image processing device 1005 can be achieved with a simple hardware configuration.

This is because the image processing device of the present exemplary embodiment is constituted by the program operating on the CPU 591.

<Hardware Configuration of Each Exemplary Embodiment>

The image processing device 1001, the image processing device 1002, the image processing device 1003, and the image processing device 1004 explained in the first to fourth exemplary embodiments may be achieved by a computer device including the CPU and the recording medium 597 storing the program like the image processing device 1005 as shown in FIG. 25. In this case, the program executed by the CPU may be a program for executing each operation of the image processing device 1001, the image processing device 1002, the image processing device 1003, and the image processing device 1004 explained in each of the above exemplary embodiments.

Each exemplary embodiment explained above may be made by combining exemplary embodiments. The exemplary embodiment made by combining the exemplary embodiments may be an exemplary embodiment of the image processing device, image processing method and image processing program including the all the functional constituent elements and advantages of the first to fifth exemplary embodiments, for example.

Some or all of the above exemplary embodiments may be described as the following supplementary notes, but are not limited to the following.

(Supplementary Note 1)

An image processing device including an image group generation unit for using a dictionary storing a plurality of patch pairs including a degraded patch which is a patch of a degraded image obtained by degrading a predetermined image and a restored patch which is a patch of said predetermined image in such a manner that the degraded patch and the restored patch are associated with each other to generate a plurality of restored image candidates including a plurality of different contents that may be an original content of an input image from said single input image, and an image selection presenting unit for clustering said multiple restored image candidates, and selecting and outputting said restored image candidate on the basis of said result of clustering.

(Supplementary Note 2)

The image processing device described in Supplementary note 1 further including a reliability degree calculation unit for calculating a degree of reliability of each of the restored image candidates generated by said image group generation unit, wherein said image selection presenting unit selects said restored image candidate on the basis of said degree of reliability.

(Supplementary Note 3)

The image processing device described in Supplementary note 2, characterized in that said reliability degree calculation unit generates a reduced-quality image from said restored image, and calculates said degree of reliability on the basis of a difference between said reduced-quality image and said input image.

(Supplementary Note 4)

The image processing device described in Supplementary note 2 or 3, characterized in that said reliability degree calculation unit calculates said degree of reliability on the basis of a difference between restored patches adjacent to each other in a case where said restored image is generated.

(Supplementary Note 5)

The image processing device according to any one of Supplementary notes 2 to 4, characterized in that said reliability degree calculation unit calculates said degree of reliability on the basis of a degree of risk which is a ratio of a similarity degree between said degraded patches and a similarity degree between said restored patches corresponding to said degraded patches.

(Supplementary Note 6)

The image processing device according to any one of Supplementary notes 2 to 5, characterized in that said reliability degree calculation unit calculates said degree of reliability on the basis of a statistical deviation of said restored image candidates.

(Supplementary Note 7)

The image processing device according to any one of Supplementary notes 2 to 6, characterized in that said reliability degree calculation unit calculates said degree of reliability for each class of said clustered restored image candidates, and said image selection presenting unit selects and outputs said restored image candidate for each of said classes on the basis of the degree of reliability calculated for each of said classes.

(Supplementary Note 8)

The image processing device according to any one of Supplementary notes 2 to 7, characterized in that said image selection presenting unit cuts out a particular portion restored image candidate which is a particular portion of each of said restored image candidates, clusters said particular portion restored image candidates, and selects and outputs said particular portion restored image candidate on the basis of said result of clustering.

(Supplementary Note 9)

The image processing device described in Supplementary note 8, characterized in that said reliability degree calculation unit calculates the degree of reliability of said particular portion restored image candidate.

(Supplementary Note 10)

The image processing device according to any one of Supplementary notes 2 to 9, characterized in that said image selection presenting unit divides each of said restored image candidates into a plurality of divided restored image candidates, clusters each of a group made up with said divided restored image candidates corresponding to a same position, selects said divided restored image candidate for each of said groups on the basis of said result of clustering, and generates and outputs a restored image by compositing said selected divided restored image candidate.

(Supplementary Note 11)

The image processing device described in Supplementary note 10, characterized in that said reliability degree calculation unit calculates the degree of reliability of said divided restored image candidate.

(Supplementary Note 12)

The image processing device according to any one of Supplementary notes 1 to 11, characterized in that said image group generation unit generates, from said input image, said restored image candidates respectively corresponding to maximum values of said probability distribution functions of which hyperparameters are different.

(Supplementary Note 13)

The image processing device according to any one of Supplementary notes 1 to 12, characterized in that said image group generation unit generates, from said input image, said restored image candidates respectively corresponding to a plurality of local maximum values of probability distribution functions made by modeling a relationship of said input image, a restored image candidate corresponding to said input image, and a patch pair.

(Supplementary Note 14)

The image processing device according to any one of Supplementary notes 1 to 13, characterized in that said image group generation unit generates, from said input image, said restored image candidates respectively corresponding to the local maximum values of said probability distribution functions of which hyperparameters are different.

(Supplementary Note 15)

The image processing device according to any one of Supplementary notes 1 to 10, characterized in that said image group generation unit selects a plurality of restored patches corresponding to a plurality of degraded patches of which similarity degree with respect to said input patch is equal to or more than a threshold value for each input patch that is cut out from said input image, and generates said restored image candidates by combining said selected restored patches respectively corresponding to said input patches.

(Supplementary Note 16)

The image processing device according to any one of Supplementary notes 1 to 15 further including a dictionary unit for storing said patch pairs, and a learning unit for generating said patch pairs, and output said patch pairs to said dictionary unit.

(Supplementary Note 17)

An image processing method executed by a computer, comprising using a dictionary storing a plurality of patch pairs including a degraded patch which is a patch of a degraded image obtained by degrading a predetermined image and a restored patch which is a patch of said predetermined image in such a manner that the degraded patch and the restored patch are associated with each other to generate a plurality of restored image candidates including a plurality of different contents that may be an original content of an input image from said single input image; and clustering said restored image candidates, and selecting and outputting said restored image candidate on the basis of said result of clustering.

(Supplementary Note 18)

The image processing method described in Supplementary note 17, characterized in causing said computer to calculate a degree of reliability of each of the restored image candidates generated, and select said restored image candidate on the basis of said degree of reliability.

(Supplementary Note 19)

The image processing method described in Supplementary note 18, characterized in causing said computer to generate a reduced-quality image from said restored image, and calculate said degree of reliability on the basis of a difference between said reduced-quality image and said input image.

(Supplementary Note 20)

The image processing method described in Supplementary note 18 or 19, characterized in causing said computer to calculate said degree of reliability on the basis of a difference between restored patches adjacent to each other in a case where said restored image is generated.

(Supplementary Note 21)

The image processing method described in any one of Supplementary notes 18 to 20, characterized in causing said computer to calculate said degree of reliability on the basis of a degree of risk which is a ratio of a similarity degree between said degraded patches and a similarity degree between said restored patches corresponding to said degraded patches.

(Supplementary Note 22)

The image processing method described in any one of Supplementary notes 18 to 21, characterized in causing said computer to calculate said degree of reliability on the basis of a statistical deviation of said restored image candidates.

(Supplementary Note 23)

The image processing method described in any one of Supplementary notes 18 to 22, characterized in causing said computer to calculate said degree of reliability for each class of said clustered restored image candidates, and select and output said restored image candidate for each of said classes on the basis of the degree of reliability calculated for each of said classes.

(Supplementary Note 24)

The image processing method described in any one of Supplementary notes 17 to 23, characterized in causing said computer to cut out a particular portion restored image candidate which is a particular portion of each of said restored image candidates, cluster said particular portion restored image candidates, and select and output said particular portion restored image candidate on the basis of said result of clustering.

(Supplementary Note 25)

The image processing method described in Supplementary note 24, characterized in causing said computer to calculate the degree of reliability of said particular portion restored image candidate.

(Supplementary Note 26)

The image processing method described in any one of Supplementary notes 17 to 25, characterized in causing said computer to divide each of said restored image candidates into a plurality of divided restored image candidates, cluster each of a group made up with said divided restored image candidates corresponding to a same position, select said divided restored image candidate for each of said groups on the basis of said result of clustering, and generate and output a restored image by compositing said selected divided restored image candidate.

(Supplementary Note 27)

The image processing method described in Supplementary note 26, characterized in causing said computer to calculate the degree of reliability of said divided restored image candidate.

(Supplementary Note 28)

The image processing method described in any one of Supplementary notes 17 to 27, characterized in causing said computer to generate, from said input image, said restored image candidates respectively corresponding to maximum values of said probability distribution functions of which hyperparameters are different.

(Supplementary Note 29)

The image processing method described in any one of Supplementary notes 17 to 28, characterized in causing said computer to generate, from said input image, said restored image candidates respectively corresponding to a plurality of local maximum values of probability distribution functions made by modeling a relationship of said input image, a restored image candidate corresponding to said input image, and a patch pair.

(Supplementary Note 30)

The image processing method described in any one of Supplementary notes 17 to 29, characterized in causing said computer to generate, from said input image, said restored image candidates respectively corresponding to the local maximum values of said probability distribution functions of which hyperparameters are different.

(Supplementary Note 31)

The image processing method described in any one of Supplementary notes 17 to 30, characterized in causing said computer to select a plurality of restored patches corresponding to a plurality of degraded patches of which similarity degree with respect to said input patch is equal to or more than a threshold value for each input patch that is cut out from said input image, and generate said restored image candidates by combining said selected restored patches respectively corresponding to said input patches.

(Supplementary Note 32)

An image processing program causing a computer to execute processing of using a dictionary storing a plurality of patch pairs including a degraded patch which is a patch of a degraded image obtained by degrading a predetermined image and a restored patch which is a patch of said predetermined image in such a manner that the degraded patch and the restored patch are associated with each other to generate a plurality of restored image candidates including a plurality of different contents that may be an original content of an input image from said single input image, and processing of clustering said restored image candidates, and selecting and outputting said restored image candidate on the basis of said result of clustering.

(Supplementary Note 33)

The image processing program described in Supplementary note 32, characterized in causing said computer to execute processing of calculating a degree of reliability of each of the restored image candidates generated, and processing of selecting said restored image candidate on the basis of said degree of reliability.

(Supplementary Note 34)

The image processing program described in Supplementary note 33, characterized in causing said computer to execute processing of generating a reduced-quality image from said restored image, and calculating said degree of reliability on the basis of a difference between said reduced-quality image and said input image.

(Supplementary Note 35)

The image processing program described in Supplementary note 33 or 34, characterized in causing said computer to execute processing of calculating said degree of reliability on the basis of a difference between restored patches adjacent to each other in a case where said restored image is generated.

(Supplementary Note 36)

The image processing program described in any one of Supplementary notes 33 to 35, characterized in causing said computer to execute processing of calculating said degree of reliability on the basis of a degree of risk which is a ratio of a similarity degree between said degraded patches and a similarity degree between said restored patches corresponding to said degraded patches.

(Supplementary Note 37)

The image processing program described in any one of Supplementary notes 33 to 36, characterized in causing said computer to execute processing of calculating said degree of reliability on the basis of a statistical deviation of said restored image candidates.

(Supplementary Note 38)

The image processing program described in any one of Supplementary notes 33 to 37, characterized in causing said computer to execute processing of calculating said degree of reliability for each class of said clustered restored image candidates, and processing of selecting and outputting said restored image candidate for each of said classes on the basis of the degree of reliability calculated for each of said classes.

(Supplementary Note 39)

The image processing program described in any one of Supplementary notes 33 to 38, characterized in causing said computer to execute processing of cutting out a particular portion restored image candidate which is a particular portion of each of said restored image candidates, and processing of clustering said particular portion restored image candidates, and selecting and outputting said particular portion restored image candidate on the basis of said result of clustering.

(Supplementary Note 40)

The image processing program described in Supplementary note 39, characterized in causing said computer to execute processing of calculating the degree of reliability of said particular portion restored image candidate.

(Supplementary Note 41)

The image processing program described in any one of Supplementary notes 32 to 40, characterized in causing said computer to execute processing of dividing each of said restored image candidates into a plurality of divided restored image candidates, and processing of clustering each of a group made up with said divided restored image candidates corresponding to a same position, selecting said divided restored image candidate for each of said groups on the basis of said result of clustering, and generating and outputting a restored image by compositing said selected divided restored image candidate.

(Supplementary Note 42)

The image processing program described in Supplementary note 41, characterized in causing said computer to execute processing of calculating the degree of reliability of said divided restored image candidate.

(Supplementary Note 43)

The image processing program described in any one of Supplementary notes 32 to 42, characterized in causing said computer to execute processing of generates, from said input image, said restored image candidates respectively corresponding to maximum values of said probability distribution functions of which hyperparameters are different.

(Supplementary Note 44)

The image processing program described in any one of Supplementary notes 32 to 43, characterized in causing said computer to execute processing of generating, from said input image, said restored image candidates respectively corresponding to a plurality of local maximum values of probability distribution functions made by modeling a relationship of said input image, a restored image candidate corresponding to said input image, and a patch pair.

(Supplementary Note 45)

The image processing program described in any one of Supplementary notes 32 to 44, characterized in causing said computer to execute processing of generating, from said input image, said restored image candidates respectively corresponding to the local maximum values of said probability distribution functions of which hyperparameters are different.

(Supplementary Note 46)

The image processing program described in any one of Supplementary notes 32 to 45, characterized in causing said computer to execute processing of selecting a plurality of restored patches corresponding to a plurality of degraded patches of which similarity degree with respect to said input patch is equal to or more than a threshold value for each input patch that is cut out from said input image, and processing of generating said restored image candidates by combining said selected restored patches respectively corresponding to said input patches.

(Supplementary Note 47)

A non-transitory computer-readable recording medium recorded with an image processing program described in any one of Supplementary notes 32 to 46.

(Supplementary Note 48)

An image processing device including an image group generation unit for generating a plurality of restored image candidates including different contents similar to an input image, and image selection presenting means for clustering said restored image candidates, and selecting and outputting restored image candidates from at least two or more classes.

(Supplementary Note 49)

An image processing method executed by a computer, comprising generating a plurality of restored image candidates including different contents similar to an input image, and clustering said restored image candidates, and selecting and outputting restored image candidates from at least two or more classes.

(Supplementary Note 50)

An image processing program causing a computer to execute processing of generating a plurality of restored image candidates including different contents similar to an input image, and processing of clustering said restored image candidates, and selecting and outputting restored image candidates from at least two or more classes.

While the present invention has been described with reference to the exemplary embodiment, the present invention is not limited to the above-mentioned exemplary embodiment. Various changes, which a person skilled in the art can understand, can be added to the composition and the details of the invention of the present application in the scope of the invention of the present application.

This application is based upon and claims the benefit of priority from Japanese Patent Application No. 2012-267402 filed on Dec. 6, 2012, the disclosure of which is incorporated herein in its entirety by reference.

REFERENCE SIGNS LIST 10 learning image
20 degraded image
30 input image
31 input patch
40 restored image
50 patch
51 pixel group
52 pixel
53 patch identifier 60 hyperparameter set
101 learning device
110 reception unit
120 degraded image generation unit
130 patch pair generation unit
140 registration unit
200 dictionary
201 restored patch
202 degraded patch
203 patch pair
301 restoring device
310 reception unit
501 image group generation unit
502 image group generation unit
504 image group generation unit
505 image group generation unit
511 image selection presenting unit
513 image selection presenting unit
514 image selection presenting unit
515 image selection presenting unit
521 patch generation unit
531 hyperparameter set generation unit
532 hyperparameter set generation unit
541 restored image candidate generation unit
542 restored image candidate generation unit
554 the reliability degree calculation unit
591 CPU
592 storage unit
593 storage device
594 input unit
595 output unit
596 communication unit
597 recording medium
1000 image processing system
1001 image processing device
1002 image processing device
1003 image processing device
1004 image processing device
1005 image processing device

What is claimed is:

1. An image processing device comprising:
a processor configured to:
  use a dictionary storing a plurality of patch pairs including a degraded patch which is a patch of a degraded image obtained by degrading a predetermined image and a restored patch which is a patch of said predetermined image in such a manner that the degraded patch and the restored patch are associated with each other, and generate a plurality of restored image candidates including a plurality of different contents that may be an original content of an input image from said single input image;
  generate a reduced-quality image from said restored image, and calculate a degree of reliability of the restored image candidate on the basis of a difference between said reduced-quality image and said input image; and
  select and output said restored image candidate on the basis of said degree of reliability.

2. The image processing device according to claim 1, wherein said processor is further configured to calculate said degree of reliability on the basis of a difference between restored patches adjacent to each other in a case where said restored image is generated.

3. The image processing device according to claim 1, wherein said processor is further configured to calculate said degree of reliability on the basis of a degree of risk which is a ratio of a similarity degree between said degraded patches and a similarity degree between said restored patches corresponding to said degraded patches.

4. The image processing device according to claim 1, wherein said processor is further configured to calculate said degree of reliability on the basis of a statistical deviation of said restored image candidates.

5. The image processing device according to claim 1, wherein said processor is further configured to calculate said degree of reliability for each class of said clustered restored image candidates, and
  said processor is further configured to select and output said restored image candidate for each of said classes on the basis of the degree of reliability calculated for each of said classes.

6. The image processing device according to claim 1, wherein said processor is further configured to cut out a particular portion restored image candidate which is a particular portion of each of said restored image candidates, cluster said particular portion restored image candidates, and select and output said particular portion restored image candidate on the basis of said result of clustering.

7. The image processing device according to claim 6, wherein said processor is further configured to calculate the degree of reliability of said particular portion restored image candidate.

8. The image processing device according to claim 1, wherein said processor is further configured to divide each of said restored image candidates into a plurality of divided restored image candidates, cluster each of a group made up with said divided restored image candidates corresponding to a same position, select said divided restored image candidate for each of said groups on the basis of said result of clustering, and generate and output a restored image by compositing said selected divided restored image candidate.

9. The image processing device according to claim 8, wherein said processor is further configured to calculate the degree of reliability of said divided restored image candidate.

10. The image processing device according to claim 1, wherein said processor is further configured to generate, from said input image, said restored image candidates respectively corresponding to maximum values of said probability distribution functions of which hyperparameters are different.

11. The image processing device according to claim 1, wherein said processor is further configured to generate, from said input image, said restored image candidates respectively corresponding to a plurality of local maximum values of probability distribution functions made by modeling a relationship of said input image, a restored image candidate corresponding to said input image, and a patch pair.

12. The image processing device according to claim 1, wherein said processor is further configured to generate, from said input image, said restored image candidates respectively corresponding to the local maximum values of said probability distribution functions of which hyperparameters are different.

13. The image processing device according to claim 1, wherein said processor is further configured to select a plurality of restored patches corresponding to a plurality of degraded patches of which similarity degree with respect to said input patch is equal to or more than a threshold value for each input patch that is cut out from said input image, and generate said restored image candidates by combining said selected restored patches respectively corresponding to said input patches.

14. The image processing device according to claim 1 further comprising:
a storage device that stores said patch pairs,
said processor is further configured to generate said patch pairs, and output said patch pairs to said storage device.

15. An image processing method executed by a computer, comprising:
using a dictionary storing a plurality of patch pairs including a degraded patch which is a patch of a degraded image obtained by degrading a predetermined image and a restored patch which is a patch of said predetermined image in such a manner that the degraded patch and the restored patch are associated with each other to generate a plurality of restored image candidates including a plurality of different contents that may be an original content of an input image from said single input image;
generating a reduced-quality image from said restored image;
calculating a degree of reliability of the restored image candidate on the basis of a difference between said reduced-quality image and said input image; and
selecting and outputting said restored image candidate on the basis of said result of clustering.

16. A non-transitory computer-readable recording medium recorded with an image processing program causing a computer to execute:
using a dictionary storing a plurality of patch pairs including a degraded patch which is a patch of a degraded image obtained by degrading a predetermined image and a restored patch which is a patch of said predetermined image in such a manner that the degraded patch and the restored patch are associated with each other to generate a plurality of restored image candidates including a plurality of different contents that may be an original content of an input image from said single input image;
generating a reduced-quality image from said restored image;
calculating a degree of reliability of the restored image candidate on the basis of a difference between said reduced-quality image and said input image; and
selecting and outputting said restored image candidate on the basis of said result of clustering.

17. An image processing device comprising:
image group generation means for using a dictionary storing a plurality of patch pairs including a degraded patch which is a patch of a degraded image obtained by degrading a predetermined image and a restored patch which is a patch of said predetermined image in such a manner that the degraded patch and the restored patch are associated with each other to generate a plurality of restored image candidates including a plurality of different contents that may be an original content of an input image from said single input image;
reliability degree calculation means for calculating a degree of reliability of each of the restored image candidates generated by said image group generation means, generates a reduced-quality image from said restored image, and calculates said degree of reliability on the basis of a difference between said reduced-quality image and said input image; and
image selection presenting means for selecting and outputting said restored image candidate on the basis of said degree of reliability.

* * * * *